United States Patent [19]
Ogawa et al.

[11] Patent Number: 5,866,194
[45] Date of Patent: Feb. 2, 1999

[54] METHOD AND APPARATUS FOR MANUFACTURING HEATER ROLLER

[75] Inventors: Yoshiharu Ogawa, Nagoya; Kazuo Kobayashi, Nisshin; Ken Takeoka, Miyagawa-mura; Kazunori Hosomi, Chikushino, all of Japan

[73] Assignee: Noritake Co., Ltd., Nagoya, Japan

[21] Appl. No.: 661,610

[22] Filed: Jun. 11, 1996

[30] Foreign Application Priority Data

Jun. 15, 1995 [JP] Japan ..................................... 7-148814

[51] Int. Cl.⁶ ....................................................... B05D 5/12
[52] U.S. Cl. ............................. 427/8; 427/101; 427/106; 427/166; 118/210; 118/232; 118/256; 118/669; 118/679; 118/712; 492/46
[58] Field of Search ................................ 427/8, 101, 106, 427/166, 126.2, 126.5, 419.2; 492/46; 118/321, 323, 669, 679, 712, 210, 232, 256; D2/11

[56] References Cited

U.S. PATENT DOCUMENTS 1,141,320  6/1915  Crump .............................. 118/DIG. 11
5,201,951  4/1993  Shigeta .............................. 118/DIG. 11

FOREIGN PATENT DOCUMENTS

A-63-158582  7/1988  Japan .
A-63-158583  7/1988  Japan .

*Primary Examiner*—Brian K. Talbot
*Attorney, Agent, or Firm*—Oliff & Berridge, PLC

[57] ABSTRACT

Method and apparatus for manufacturing a heater roller which includes a cylindrical electrically insulating substrate having an outer circumferential surface, and an electrically resistive heat generating layer formed on the substrate for heating a desired member in evenly pressing contact with that member, wherein an electrically resistive paste for forming the electrically resistive layer is delivered from a paste delivery tube of a paste delivery device onto the outer circumferential surface of the substrate, while the cylindrical substrate is rotated about its axis and while the paste delivery device and the electrically insulating substrate are fed relative to each other in the axial direction of the cylindrical substrate, such that the relative feeding speed is controlled in relation to the relative position of the paste delivery device and the substrate in the axial direction of the substrate, within a range that permits formation of a film of the electrically resistive paste on the substrate, which film is continuous in the axial direction of the substrate.

15 Claims, 14 Drawing Sheets

METHOD AND APPARATUS FOR MANUFACTURING HEATER ROLLER

BACKGROUND OF THE INVENTION

1. Field of the Invention

The present invention relates in general to a method and an apparatus for manufacturing a heater roller used for fixing a toner on a recording medium, which heater roller is used on an electrophotographic or electrostatic image forming device. More particularly, this invention is concerned with techniques for controlling the temperature distribution of such a heater roller in the axial direction.

2. Discussion of the Related Art

In one example of such electrostatic image forming device wherein an image consisting of a toner transferred to a recording medium such as a paper sheet or web is fixed on the recording medium under heat and pressure while the medium is passed through a nip between a heater roller and a pressure roller which are provided in the image forming device. In one type of the heater roller, an electrically resistive heat generating layer is formed on the outer circumferential surface of a cylindrical electrically insulating substrate or core. An example of this surface heating type of heater roller is disclosed in JP-A-63-158582. The surface heating type heater roller is adapted such that heat is generated by the electrically resistive heat generating layer which provides the surface that directly contacts the recording medium such as a paper sheet. Therefore, the surface of the heater roller can be heated to a desired operating temperature in a shorter length of time or requires a shorter pre-heating time, than the surface of a conventional internal heating type heater roller in which a heat source such as a halogen lamp is provided in an inner portion of a cylindrical roller body. Accordingly, the surface heating type heater roll has an advantage that the required power consumption is relatively small.

The heater roller of the surface heating type described above is manufactured as disclosed in JP-A-63-158583, for example, by forming an electrically resistive heat generating layer on the outer circumferential surface of a cylindrical substrate or core of an electrically insulating material, by transferring a paste of an electrically resistive material from a suitable transfer sheet to the surface of the cylindrical electrically insulating substrate, or by printing using such an electrically resistive paste. In the former case, the paste may be applied to the transfer sheet by printing in a desired pattern corresponding to the electrically resistive heat generating layer to be formed on the cylindrical substrate. In the latter case, the paste is directly printed on the circumferential surface of the cylindrical substrate by using a suitable printing machine adapted to effect printing on a curved surface. The electrically resistive heat generating layer thus formed on the electrically insulating substrate tends to have an undesired distribution of its electrical resistance (which causes an undesired distribution of its temperature) due to a variation or uneven distribution of the electrical conductivity of the electrically resistive paste and/or the thickness of the electrically resistive heat generating layer formed from the paste by printing. To improve the distribution of the electrical resistance of the electrically resistive heat generating layer once formed, a suitable additional thickness of the electrically resistive paste may be applied to a portion of the initially formed heat generating layer at which the electrical resistance is comparatively high. Further, it is generally known that the temperature of the heater roller is lower at its axially end portions than at its axially intermediate portion, due to an uneven distribution of the heat dissipation in the axial direction. To correct this uneven distribution of the temperature of the heater roller, a suitable additional thickness of the electrically resistive paste may be applied to the axially intermediate portion of the initially formed heat generating layer, so that the axially intermediate portion of the heat generating layer has a comparatively large thickness value.

In the known method of manufacturing the heater roller in which the thickness of the electrically resistive heat generating layer is locally adjusted to assure even axial distribution of the temperature, the circumferential surface of the heater roller has undesirable waviness or stepped sections due to the local addition of the electrically resistive paste. Usually, the electrically resistive heat generating layer formed from the electrically resistive paste by the conventional thick-film forming technique has a comparatively large thickness between 10 $\mu$m and 20 $\mu$m, for example. Consequently, the force which acts on the recording medium during passage thereof through a nip between the heater roller and the pressure roller tends to be uneven over the surface area of the recording medium, whereby the toner transferred to the medium cannot be uniformly fixed on the medium. This is a problem encountered in the prior art.

SUMMARY OF THE INVENTION

It is therefore a first object of the present invention to provide a method of manufacturing a heater roller, which ensures not only desired distribution of the electrical resistance of the electrically resistive heat generating layer but also even distribution of the force acting on the recording medium.

It is a second object of this invention to provide an apparatus suitable for practicing the method of the invention.

The first object may be achieved according to a first aspect of this invention, which provides a method of manufacturing a heater roller which includes a cylindrical electrically insulating substrate having an outer circumferential surface, and an electrically resistive heat generating layer formed on the outer circumferential surface of the substrate, for heating a desired member in evenly pressing contact with the desired member, the method comprising the steps of: (a) rotating the cylindrical electrically insulating substrate about an axis thereof; (b) delivering an electrically resistive paste for forming the electrically resistive layer, from a paste delivery tube of a paste delivery device onto the outer circumferential surface of the cylindrical electrically insulating substrate; and (c) feeding the paste delivery device and the cylindrical electrically insulating substrate relative to each other in an axial direction of the cylindrical electrically insulating substrate, at a feeding speed which is controlled in relation to a relative position of the paste delivery device and the cylindrical electrically insulating substrate in the axial direction, within a range of the feeding speed that permits formation of a film of the electrically resistive paste on the outer circumferential surface of the substrate, which film is continuous in the axial direction.

In the method of the present invention, the electrically resistive paste is delivered from the paste delivery tube of the paste delivery device onto the outer circumferential surface of the cylindrical electrically insulating substrate while the cylindrical substrate is rotated about its axis and while the paste delivery device and the cylindrical substrate are fed relative to each other in the axial direction of the cylindrical substrate, such that the relative feeding speed of the paste delivery device and the substrate is controlled in relation to the relative position of the paste delivery device and the substrate in the axial direction of the substrate, within a range that permits the delivered electrically resistive paste to form a continuous film which is continuous in the axial direction of the cylindrical substrate. The tip of the paste delivery tube is moved on the outer circumferential surface of the cylindrical substrate, so as to take or describe a helical path so that the electrically resistive paste delivered from the paste delivery tube forms the axially continuous film on the outer circumferential surface of the substrate. The amount of the electrically resistive paste delivered to the substrate per unit axial length of the substrate varies with a change in the pitch of the helical path as the relative feeding speed of the paste delivery device and the substrate is changed. Accordingly, the thickness of the electrically resistive paste film applied to the substrate is changed with the relative feeding speed. Since the electrically resistive paste maintains a suitable degree of fluidity, the delivered paste flows in the direction of reducing a thickness variation at the portions of the cylindrical substrate at which the relative feeding speed is changed. Therefore, the thickness of the film of the applied electrically resistive paste tends to change continuously in the axial direction of the substrate.

Since the film of the electrically resistive paste applied onto the outer circumferential surface of the cylindrical electrically insulating substrate has an axially continuously changing thickness, the electrically resistive heat generating layer formed from the electrically resistive paste film has also a continuously changing thickness. Accordingly, the heat generating layer whose electrical resistance has a desired distribution in the axial direction by suitable adjustment of its thickness does not suffer from stepped portions due to sudden change of the thickness, contrary to the heat generating layer whose thickness is locally increased by additional application of the electrically resistive paste to the initially applied paste as in the conventional method. Therefore, the heater roller manufactured according to the present method not only has a desired distribution of the electrical resistance of the electrically resistive heat generating layer, but also assures even distribution of the force generated at the pressure nip between the present heater roller and a suitable pressure roller over the entire length of the rollers.

In one preferred form of the above first aspect of this invention, the method further comprises a step of rotating the cylindrical electrically insulating substrate for a predetermined time even after the film of the electrically resistive paste has been formed over a predetermined axial length of the cylindrical substrate, for reducing a thickness variation of the film of the electrically resistive paste which may occur due to gravity and some fluctuating factors during the formation of the film.

The first object indicated above may also be achieved according to a second aspect of this invention, which provides a method of manufacturing a heater roller which includes a cylindrical electrically insulating substrate having an outer circumferential surface, and an electrically resistive heat generating layer which is formed on the outer circumferential surface of the substrate, for heating a desired member in evenly pressing contact with the desired member, the method comprising: (a) a rotating step of rotating the cylindrical electrically insulating substrate about an axis thereof; (b) a delivering step of delivering an electrically resistive paste for forming the electrically resistive layer, from a paste delivery tube of a paste delivery device onto the outer circumferential surface of the cylindrical electrically insulating substrate, the electrically resistive paste containing a metal-organic compound; (c) a first feeding step of feeding the paste delivery device and the cylindrical electrically insulating substrate relative to each other in an axial direction of the cylindrical electrically insulating substrate at a constant feeding speed which is determined so as to permit formation of a first film of the electrically resistive paste on the outer circumferential surface of the substrate, which film is continuous in the axial direction; (d) a second feeding step of feeding the paste delivery device and the cylindrical electrically insulating substrate relative to each other in the axial direction at a feeding speed which is controlled in relation to a relative position of the paste delivery device and the cylindrical electrically insulating substrate in the axial direction, to form a second film of the electrically resistive paste on the first film; and (e) a heating step of heating the first and second films of the electrically resistive paste to thereby form a thin metal film as the electrically resistive heat generating layer.

In the present method according to the second aspect of this invention, the electrically resistive paste containing a metal-organic compound is delivered from the paste delivery tube of the paste delivery device onto the outer circumferential surface of the cylindrical electrically insulating substrate while the cylindrical substrate is rotated about its axis and while the paste delivery device and the cylindrical substrate are fed relative to each other in the axial direction of the cylindrical substrate, at a predetermined constant feeding speed determined so as to permit the formation of a continuous first film of the electrically resistive paste on the outer circumferential surface of the substrate. The electrically resistive paste is further delivered onto the continuous first film, while the paste delivery device and the cylindrical substrate are fed relative to each other such that the relative feeding speed of the paste delivery device and the substrate is controlled in relation to the relative position of the paste delivery device and the substrate in the axial direction of the substrate, within a range that permits the delivered electrically resistive paste to form a second film of the electrically resistive paste on the continuous first film. As a result, the total thickness of the electrically resistive heat generating layer is increased at its portion where the electrically resistive paste is additionally applied in the second feeding step, and the electrical resistance of the heat generating layer is accordingly reduced at these portions. Since the pitch of the helical path taken by the tip of the paste delivery tube during feeding thereof relative to the substrate is changed as the relative feeding speed is changed, the axial distribution of the electrical resistance of the heat generating layer can be controlled by controlling the relative feeding speed of the paste delivery device and the cylindrical substrate in the second feeding step. Since a second film of the heat generating layer is a thin metallic film formed from the second film of the electrically resistive paste containing the metal-organic compound, the total thickness of the heat generating layer is comparatively small even at the portions at which the electrically resistive paste is additionally applied in the second feeding step.

In the above method according to the second aspect of the invention, the relative feeding speed of the paste delivery device and the cylindrical electrically insulating substrate is changed in relation to the relative position of these device and substrate in the axial direction in the second feeding speed, so that the electrically resistive heat generating layer can be given the desired distribution of the electrical resistance. Further, the second film of the electrically resistive paste formed in the second feeding step will not cause considerably stepped portion on the surface of the heat generating layer. Thus, the present method makes it possible to manufacture the heater roller whose heat generating layer has the desired distribution of the electrical resistance and which assures even distribution of the force generated at the pressure nip between the heater roller and the pressure roller. The entire or partial or local lamination of the first and second films of the heat generating layer is effective to reduce the drawback of the conventional heater roller having a single electrically resistive film as the heat generating layer. The electrically resistive paste containing a metal-organic compound is generally called a resinate or MOC (metal-organic compound) paste wherein particles are so small as to permit chemical bonding of metallic and organic substances, whereby the paste can be heat-treated into a thin dense metal structure suitably usable as the electrically resistive heat generating layer.

According to one preferred form of the second aspect of this invention, the method further comprises a measuring step of measuring a distribution of an electrical resistance of a first film of the electrically resistive heat generating layer, in the axial direction of the cylindrical electrically insulating substrate, which first film of the electrically resistive heat generating layer is formed from the first film of the electrically resistive paste in the first feeding step, and the feeding speed of the paste delivery device and the cylindrical electrically insulating substrate in the second feeding step is determined in relation to the relative position, on the basis of the measured axial distribution of the electrical resistance of the first film of the electrically resistive heat generating layer.

In the above preferred form of the method, the relative feeding speed of the paste delivery device and the cylindrical substrate in the second feeding step is controlled on the basis of not only the relative position of these device and substrate but also the axial distribution of the electrical resistance of the first film of the heat generating layer formed from the first film of the electrically resistive paste formed in the first feeding step. Therefore, the thickness of a second film of the heat generating layer formed from the second film of the electrically resistive paste can be controlled so as to assure the desired distribution of the overall electrical resistance of the electrically resistive heat generating layer, irrespective of a variation in the electrical resistance of the first film of the heat generating layer in the axial direction of the cylindrical substrate.

According to a second preferred form of the method of the second aspect of the present invention, the direction in which the paste delivery device and the cylindrical electrically insulating substrate are fed relative to each other in the second feeding step is reversed with respect to the direction in which the paste delivery device and the cylindrical electrically insulating substrate are fed relative to each other in the first feeding step. In this case, the paste delivery device is reciprocated relative to the cylindrical substrate, for example, in the axial direction of the substrate, so that the second feeding step follows the first feeding step without heat treatment of the first film of the electrically resistive paste, and the lamination of the first and second films of the paste is subsequently concurrently heat-treated into the electrically resistive heat generating layer. Accordingly, the time required for applying the electrically resistive paste to the cylindrical electrically insulating substrate is reduced, by elimination of a non-productive time which would otherwise be spent in returning the paste delivery device to a predetermined feeding start position.

According to a third preferred form of the method of the second aspect of this invention, the second feeding step is initiated a predetermined first time after the first feeding step is initiated and a predetermined second time before the first feeding step is terminated. In this case, the paste delivery device requires a first paste delivery device for delivering the electrically resistive paste from its paste delivery tube in the first feeding step, and a second paste delivery device for delivering the paste from its paste delivery tube in the second feeding step. The first and second paste delivery devices are operated so that at least a portion of the relative feeding movement of the second paste delivery device occurs during the relative feeding movement of the first paste delivery device, whereby the time required for completion of the first and second feeding steps (by the respective first and second paste delivery devices) can be further reduced.

As in the first aspect of this invention, the method according to the second aspect of the invention described above may further comprises a step of rotating the cylindrical electrically insulating substrate for a predetermined time even after the second film of the electrically resistive paste has been formed over a predetermined axial length of the substrate, for reducing a thickness variation of the film of the electrically resistive paste.

The second object indicated above may be achieved according to a third aspect of the present invention, which provides an apparatus for manufacturing a heater roller which includes a cylindrical electrically insulating substrate having an outer circumferential surface, and an electrically resistive heat generating layer which is formed on the outer circumferential surface of the substrate, for heating a desired member in evenly pressing contact with the desired member, the apparatus comprising: (a) a rotating device for holding the cylindrical electrically insulating substrate rotatably about an axis thereof, and rotating the cylindrical electrically insulating substrate about the axis; (b) a paste delivery device having a paste delivery tube, for delivering an electrically resistive paste for forming the electrically resistive layer, from the paste delivery tube onto the outer circumferential surface of the cylindrical electrically insulating substrate; (c) an axial drive device for feeding the paste delivery device and the cylindrical electrically insulating substrate relative to each other in an axial direction of the cylindrical electrically insulating substrate; and (d) a relative position detecting device for detecting a relative position of the paste delivery device and the cylindrical electrically insulating substrate in the axial direction; and (e) a control device for controlling a speed of a relative feeding movement of the paste delivery device and the cylindrical electrically insulating substrate, on the basis of the relative position detected by the relative position detecting device.

In the present apparatus of the invention, the the electrically resistive paste is delivered from the paste delivery tube of the paste delivery device onto the outer circumferential surface of the cylindrical electrically insulating substrate while the substrate is rotated by the rotating device and while the paste delivery device and the substrate are feed relative to each other in the axial direction of the substrate, whereby the electrically resistive paste is helically applied to the outer circumferential surface of the substrate. The relative feeding speed of the paste delivery device and the substrate is controlled by the control device on the basis of the relative position of these device and substrate which is detected by the relative position detecting device. The pitch of the helical path described by the tip of the paste delivery tube is determined by the relative feeding speed, and therefore the amount of the electrically resistive paste applied to the substrate per unit axial length thereof is controlled by the relative feeding speed. In other words, the thickness of the film of the applied electrically resistive paste can be changed by controlling the speed of the relative feeding movement of the paste delivery device and the substrate.

Thus, the apparatus according to the present third aspect of this invention makes it possible to implement the rotating step, paste delivering step and feeding step in the method according to the first aspect of this invention, and the rotating step, paste delivering step, first feeding step and second feeding step in the method according to the second aspect of this invention. The present apparatus assures not only the desired distribution of the electrical resistance of the electrically resistive heat generating layer, but also even distribution of the force to be generated at the pressure nip between the heater roller and a suitable pressure roller.

According to one preferred form of the present apparatus, the paste delivery tube has bending elasticity, the apparatus further comprising a pushing device for holding an end portion of the paste delivery tube in pressing contact with the outer circumferential surface of the cylindrical electrically insulating substrate, such that the end portion is inclined at a predetermined angle with respect to a line tangent to a circumference of the outer circumferential surface. In the present arrangement wherein the end portion of the elastic paste delivery tube is pressed onto the outer circumferential surface of the substrate at a given inclination angle with respect to the tangent line of the circumference of the substrate, the elasticity of the paste delivery tube permits its end portion to stably follow the circumference of the substrate, even where the point of contact of the tube and the substrate changes in the vertical direction due to out-of-roundness and warpage of the substrate or due to a positioning error of the paste delivery tube. Accordingly, the operating condition of the paste delivery tube (e.g., paste delivery angle and pressing force acting on the substrate surface) can be held substantially constant irrespective of the fluctuating factors indicated above. Therefore, the amount of the paste applied per unit length of the substrate is determined solely by the feeding speed of the paste delivery device and the substrate, whereby the thickness of the electrically resistive heat generating layer has an even distribution in the circumferential direction of the substrate, which ensures even distribution of the electrical resistance and surface temperature of the heat generating layer in the circumferential direction of the substrate.

According to another preferred form of the apparatus, the paste delivery device comprises a first paste delivery device having a first paste delivery tube, and a second paste delivery device having a second paste delivery tube, and the axial drive device comprises a first drive device for feeding the first paste delivery device and the cylindrical electrically insulating substrate relative to each other, and a second drive device for feeding the second paste delivery device and the substrate relative to each other. In this case, the control device controls a speed of a relative feeding movement of the second paste delivery device and the substrate. Further, the present arrangement permits formation of two films of the electrically resistive paste such that the formation of the second film is initiated a suitable time after the initiation of the formation of the first film and a suitable time before the termination of the formation of the first film, whereby the time required to form the first and second films of the paste can be considerably reduced.

BRIEF DESCRIPTION OF THE DRAWINGS

The above and optional objects, features, advantages and technical and industrial significance of this invention will be better understood by reading the following detailed description of presently preferred embodiments of the invention, when considered in connection with the accompanying drawings, in which.

DETAILED DESCRIPTION OF THE PREFERRED EMBODIMENTS

There will be described the preferred embodiments of this invention, in which the dimensions of various elements as shown do not accurately reflect the actual dimensional ratios of the elements.

Figure 1:
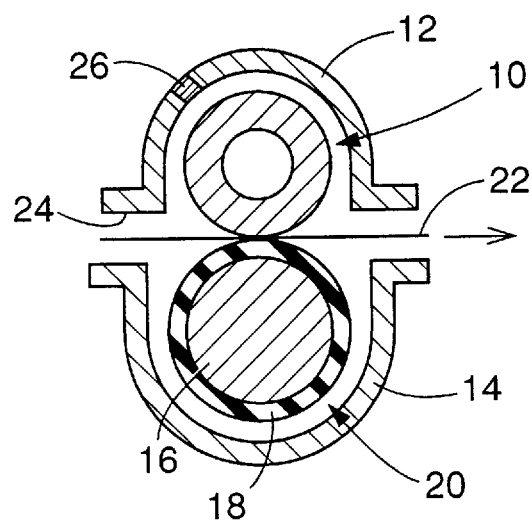
FIG. 1 is a fragmentary elevational view in cross section schematically illustrating a toner fixing portion of a copying machine, which uses a heater roller manufactured by one embodiment of an apparatus of the present invention.
Figure 2:
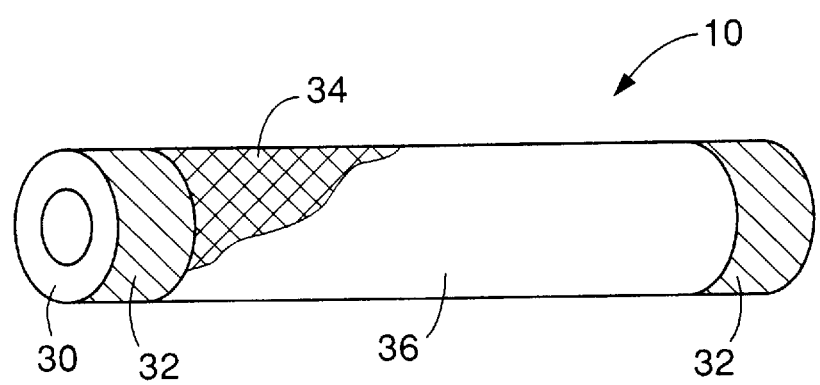
FIG. 2 is a perspective view showing a construction of the heater roller of the apparatus of FIG. 1.

Referring first to the fragmentary cross sectional view of FIG. 1, there is schematically shown a toner fixing portion of a copying machine which includes a toner fixing heater roller 10 as an example of a heater roller to be manufactured according to one embodiment of the present invention. The toner fixing heater roller 10 will be hereinafter referred to as "heater roller 10". As shown in FIG. 1, the toner fixing portion has an upper housing 12 and a lower housing 14 which are fixed such that the two housings 12, 14 are spaced apart from each other by a suitable distance in the vertical direction. In the upper and lower housings 12, 14, there are rotatably supported via bearings the heater roller 10 and a pressure roller 20, respectively. The pressure roller 20 consists of a core cylinder 16 made of aluminum and a silicone rubber layer 18 bonded to the outer circumferential surface of the core cylinder 16, for example. These heater roller 10 and the pressure roller 20 are held in pressing contact with each other with a suitable force and cooperate to provide a pressure nip therebetween. The heater roller 10 is positioned within the upper housing 12 such that a clearance between the inner surface of the upper housing 12 and the outer circumferential surface of the heater roller 10 is as small as about 1 mm. A thermocouple 26 is fixedly disposed in a through-hole formed through the wall thickness of the upper housing 12, so that the temperature within the upper housing 12 is detected by the thermocouple 26. Described more specifically, an output of the thermocouple 26 is applied to a suitable control circuit, which controls a voltage to be applied to the heater roller 10 so as to maintain the surface temperature of the heater roller 10 at a desired level. The upper and lower housings 12, 14 cooperate to define an inlet 24 through which a recording medium 22 such as a paper sheet or web is passed through the pressure nip of the heater roller 10 and the pressure roller 20, after an image is formed on the recording medium 22 by a toner transferred from a suitable toner transfer device according to an image signal. With the recording medium 22 passing through the pressure nip between the rollers 10, 20 under heat and pressure, a resin contained in the toner is melted and fixed to the surface of the recording medium 22.

The heater roller 10 includes a cylindrical electrically insulating substrate in the form of a glass cylinder 30, a pair of annular electrodes 32, 32 formed on the axially opposite end portions of the outer circumferential surface of the glass cylinder 30, an electrically resistive heat generating layer 34 which generates heat by application of an electric current between the two electrodes 32, 32, and a protective film 36 which covers the electrically resistive heat generating layer 34. The protective film 36 is provided to protect the heat generating layer 34, and to prevent adhesion of the toner to the layer 34 which would occur in the absence of the film 36.

The glass cylinder 30 is made of a suitable glass material as described below and functions as an electrically insulating substrate or core of the heater roller 10.

The glass cylinder 30, which has a center bore and a cylindrical outer circumferential surface, has a length of 330 mm, an outside diameter of 12 mm, and a wall thickness of about 1.0 mm, for example. The glass cylinder 30 is formed by drawing of a hard glass. For instance, the hard glass consists essentially of 72.0 wt. % of $SiO_2$, 10.5 wt. % of $B_2O_3$, 7.0 wt. % of $Al_2O_3$, and small amounts of alkali metals and alkaline earth metals, and has thermal conductivity of about 0.0026 cal/sec·cm·°C., specific heat capacity of about 0.17 cal/g·°C., and softening point of about 790° C.

The annular electrodes 32, 32 are formed of Ag, or Ag—Pd or Ag—Pt alloy, and has a thickness of about 8 μm. Each electrode 32 has a width of about 25 mm from the appropriate end face of the glass cylinder 30 in the axial direction of the glass cylinder 30. The electrically resistive heat generating layer 34 is formed in an axially intermediate portion of the glass cylinder 30 such that each end of the layer 34 is spaced from the appropriate end face of the glass cylinder 30 by a distance of about 21 mm, so that the heat generating layer 34 overlaps the electrodes 32, 32 over a distance of about 4 mm at the opposite end portions of the layer 34. The protective film 36 is formed in an axially intermediate portion of the glass cylinder 30 such that each end of the film 36 is spaced from the appropriate end face of the glass cylinder 30 by a distance of about 15 mm, so that the protective film 36 covers parts of the electrodes 32 and the entire area of the heat generating layer 34. For example, the protective film 36 is a film of a fluorine-containing resin (e.g., polytetrafluoroethylene) having a thickness of about 25 μm, which may be formed by dispersion coating method. This dispersion coating method may be a method in which a dispersion of a fluorine-containing resin powder in water or an organic solvent is sprayed onto the surfaces of the electrodes 32 and the electrically resistive heat generating layer 34, and the film thus formed is dried and heat-treated.

The electrically resistive heat generating layer 34 is a thin metal film produced by firing a resinate paste film which is formed, on the outer circumferential surface of the glass cylinder 30, using a liquid or paste containing a "resinate", namely, a metal-organic compound (MOC). The above liquid or paste will be referred to as "resinate paste". The film thickness of the heat generating layer 34 is about 0.8 μm at the opposite end portions, and about 1.5 μm at an intermediate portion thereof except regions of about 60 mm adjacent to the opposite end portions, whose thickness continuously increase from the opposite end portions toward the intermediate portion. The resinate paste is prepared by mixing a resinate and a suitable resin and kneading the obtained mixture. The resinate is obtained by dissolving selected metal components and by reaction of the dissolved metal components with organic compounds. For instance, the resinate paste may have a composition as indicated in TABLE 1, which includes Au as a major metal component.

TABLE 1

COMPOSITION OF RESINATE PASTE

| Components | Au | | Pd | | Bi | Rh | Glass | | |
|---|---|---|---|---|---|---|---|---|---|
| Form | MOC | Powder | MOC | Powder | MOC | MOC | powder | Resin | Solvent |
| Wt. % | 6.5 | 6.5 | 1.1 | 0.7 | 0.5 | 0.1 | 2.2 | 65.7 | 15.0 |

The components Bi (bismuth) and Rh (rhodium) in the above table may be in the form of an oxide powder. The metal-organic compound (MOC) may be a metal alkoxide, a metal acetylacetonate or metal carboxylate. The solvent is used to dilute the resinate paste so that the resinate paste has a viscosity suitable for application. For example, terpineol may be preferably used as the solvent.

Figure 3:
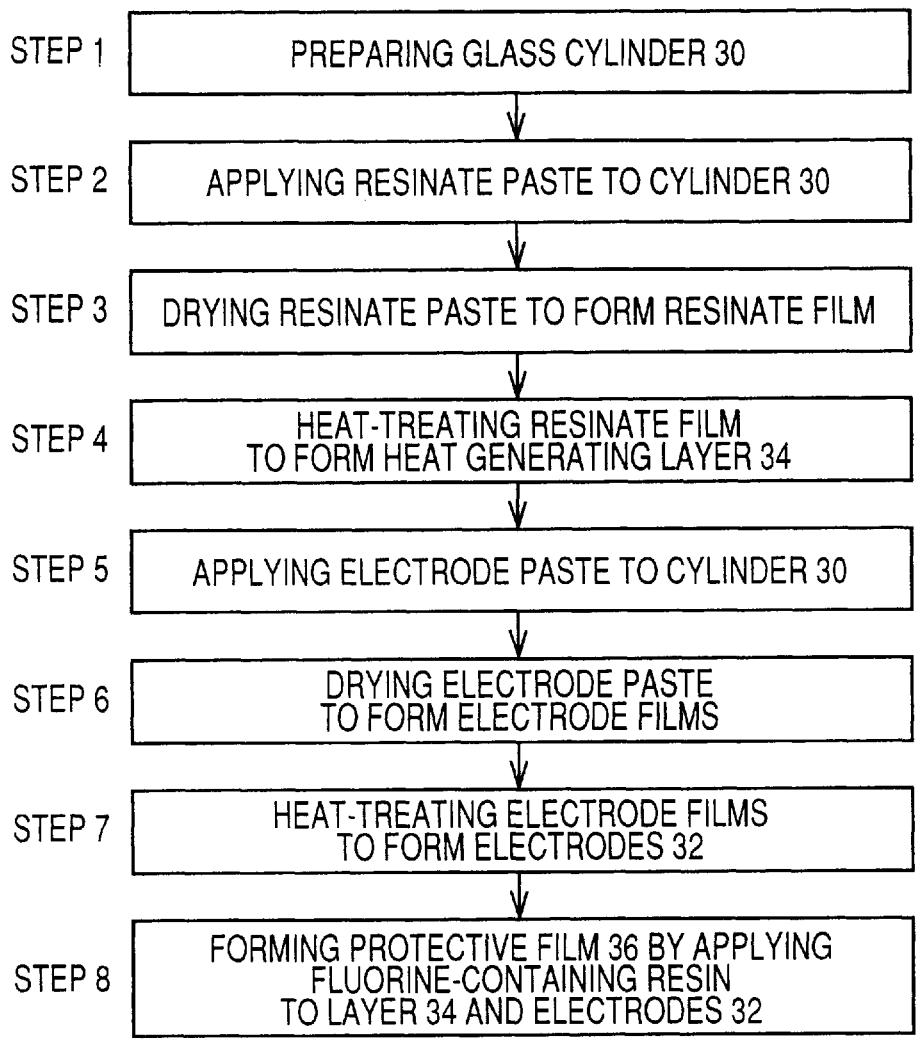
FIG. 3 is a flow chart illustrating a method of manufacturing the heater roller.

The heater roll 10 is manufactured by a process indicated in the flow chart of FIG. 3. The process is initiated with step 1 in which the glass cylinder 30 having the dimensions indicated above is prepared by cutting a hard glass cylinder produced by drawing, for example. In the next steps 2–4, the resinate paste having the composition indicated in TABLE 1 is applied to the intermediate portion of the outer circumferential surface of the glass cylinder 30, which intermediate portion has the opposite ends about 21 mm away from the opposite axial end faces of the glass cylinder 30. The applied resinate paste is dried under a predetermined condition, for example, pre-dried by hot air for several minutes and then finish-dried at about 70° C. The thus formed resinate film is heat-treated at about 525° C., for example, whereby the electrically resistive heat generating layer 34 in the form of a thin film is formed on the glass cylinder 30.

Then, steps 5–7 are implemented to apply an electrode paste of an electrically conductive material (e.g., thick-film forming paste of Ag) to the opposite axial end portions of the glass cylinder 30, over a distance of about 25 mm distance from the appropriate end faces of the glass cylinder 30. The application of this electrode paste may be effected by a well known transfer method or curved-surface printing method. The thus applied electrode paste is dried at a suitable temperature (e.g., at 120° C.), and then heat-treated at about 525° C., for example. Thus, the electrodes 32 are formed. Finally, step 8 is implemented to apply a fluorine-containing resin to the entire area of the electrically resistive heat generating layer 34 and to the axially inner portions of the electrodes 32 over a distance of about 15 mm from the appropriate end faces of the glass cylinder 30. The applied resin is dried at about 100° C., for example and heat-treated at about 360° C., for example. Thus, the protective film 36 is formed. The heater roller 10 is manufactured as described above.

Figure 4:
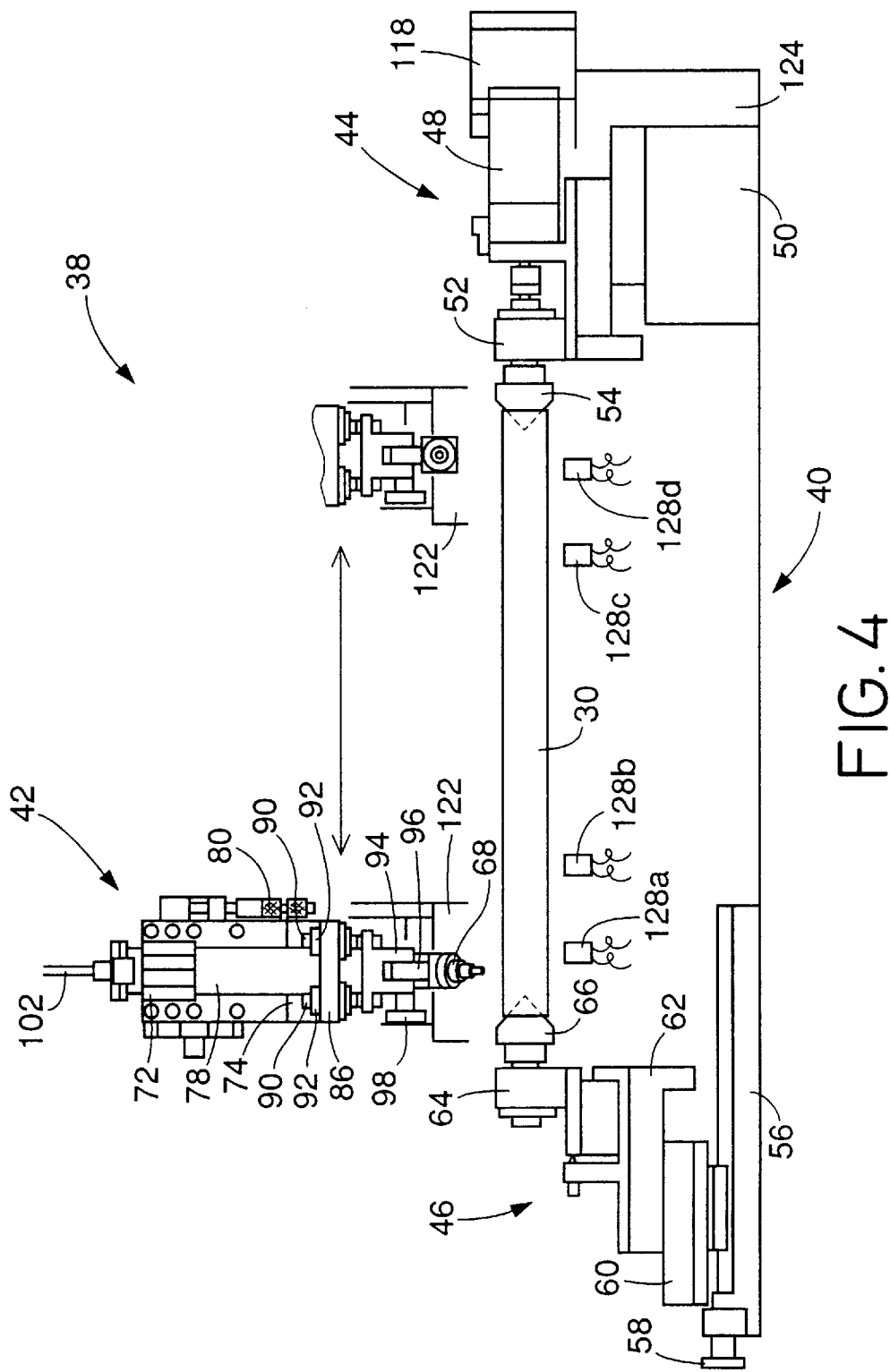
FIG. 4 is a front elevational view of the apparatus adapted to form an electrically resistive heat generating layer of the heater roller of FIG. 1.
Figure 5:
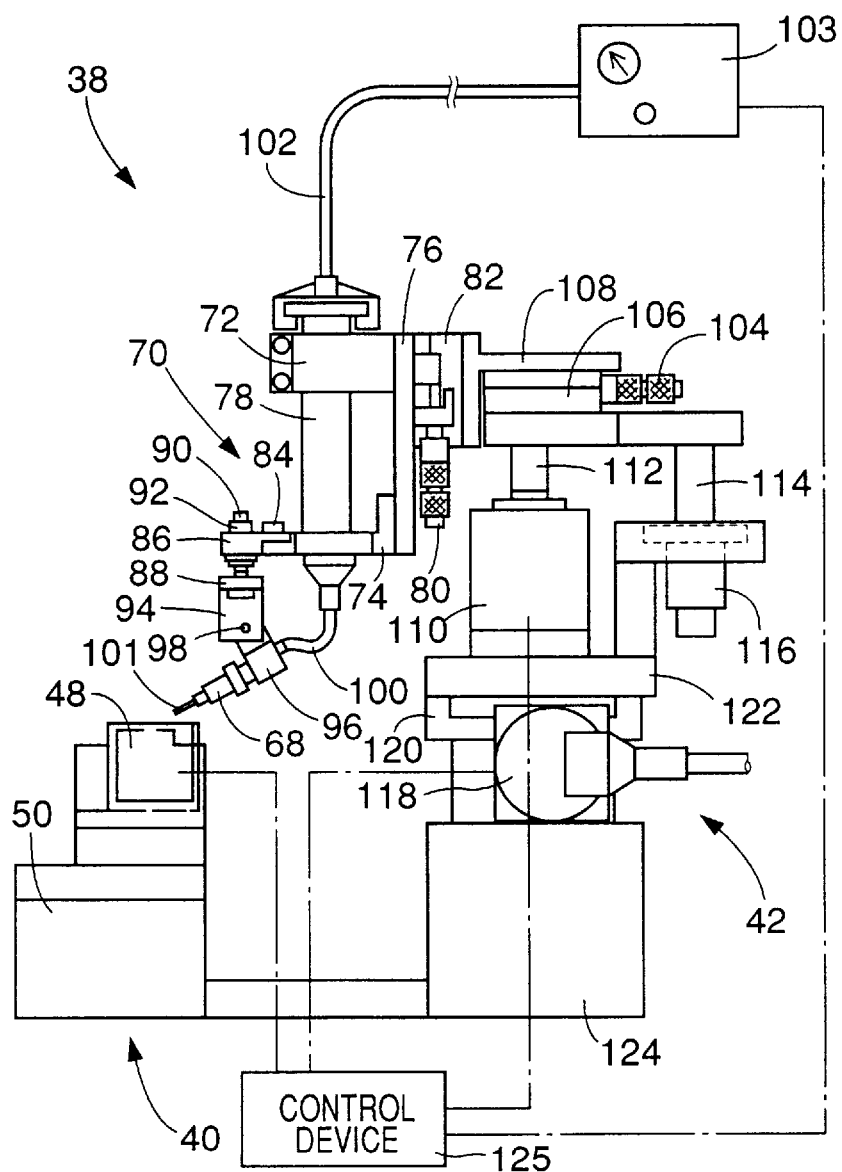
FIG. 5 is a right-side end elevational view of the apparatus of FIG. 4.

For example, the step 2 and step 5 indicated in FIG. 3 are implemented by one embodiment of an apparatus of the present invention in the form of a film forming apparatus 38 shown in FIGS. 4 and 5, which is adapted to apply the resinate paste and electrode paste to the outer circumferential surface of the glass cylinder 30. This film forming apparatus 38 includes a rotating device 40 for holding and rotating the workpiece in the form of the glass cylinder 30 about its axis, and a paste applying device 42 for applying an electrically resistive paste (e.g., resinate paste) to the outer circumferential surface of the glass cylinder 30 while the glass cylinder is rotated by the rotating device 40.

The rotating device 40 includes a drive portion 44 for rotating the glass cylinder 30, and a holder portion 46 for holding the glass cylinder 30. The holder portion 46 has a mechanism for pushing the glass cylinder 30 toward the drive portion 44 to thereby hold the glass cylinder 30. The drive portion 44 is provided with an electric motor 48, a support base 50 on which the motor 48 is fixed, and a conical driving center 54 which is rotatably supported by a bearing 52 at its shaft portion and which is rotated by the motor 48 about its axis. The electric motor 48 is a variable-speed motor whose speed is controllable. The holder portion 46 is provided with a support base 56, a first slide 60, a second slide 62 mounted on the first slide 60, a bearing 64 attached to the second slide 62, and a conical driven center 66 which is structurally similar to the conical driving center 54 and which is supported by the bearing 64 at its shaft portion about its axis. The first slide 60 is slidably moved on the base 56 by rotation of a handwheel 58, in the right and left directions as viewed in FIG. 4, that is, in the axial direction of the glass cylinder 30. The second slide 62 is slidably movable on the first slide 60 in the right and left directions and is biased by a suitable spring in the right direction as viewed in FIG. 4. The two conical centers 54, 66 are positioned such that their axes lie on a straight line. The conical driving center 54 may be considered to also function as a part of the holder portion 46.

The paste applying device 42 includes a paste delivery device 70 which has a paste delivery portion 68 at its lower end for applying the electrically resistive paste (resinate paste) to the glass cylinder 30 rotatably supported by the rotating device 40. The paste delivery device 70 is movable right and left, and up and down as seen in FIG. 4, and back and forth (in the right and left directions as seen in FIG. 5) away from and toward the axis of rotation of the glass cylinder 30.

The paste delivery device 70 is provided with a storage cylinder 78 for storing the electrically resistive paste. The storage cylinder 78 is fixed to a vertically movable member 76 via an upper holder member 72 and a lower holder member 74 such that the storage cylinder 78 has a vertical axis. The vertically movable member 76 is vertically moved on a vertical rail 82 by rotation of a fine adjustment screw 80. Namely, the paste delivery device 70 is vertically movable by rotation of the fine adjustment screw 80. As shown in FIG. 5, a horizontally pivotable member 86 is provided at the lower end of the paste delivery device 70 such that the pivotable member 86 is horizontally pivotable about the vertically extending axis of a screw 84 supported by the lower holder member 74. The pivotable member 86 is held at a desired angular position about the axis of the screw 84, by fastening the screw 84. A support member 88 is fixed by two bolts 90, 90 and two nuts 92, 92 to the lower end of the pivotable member 86. This support member 88 includes a lower fork portion 94 having a pair of parallel planar arms which are spaced apart from each other in the right and left directions of FIG. 4. The paste delivery portion 68 of the paste delivery device 70 is supported by a holder 96 which is supported by the support member 88 such that the upper portion of the holder 96 is gripped by and between the arms of the fork portion 94. The holder 96 is pivotable about the horizontally extending axis of a screw 98 threaded to the fork portion 94. The holder 96 is held at a desired angular position about the axis of the screw 98, by fastening the screw 98. In the present embodiment, the support member 88 with the fork portion 94 cooperates with the holder 96 to constitute an angle device for adjusting the angular position of the paste delivery portion 68 in the vertical plane.

The paste delivery portion 68 is connected to the storage cylinder 78 through a flexible tube 100, and is provided with an elastic delivery needle 101 at its lower end. The elastic delivery needle 101 may be a stainless steel capillary tube having an outside diameter of about 0.36 mm and an inside diameter of about 0.18 mm, for example. On the other hand, the storage cylinder 78 is connected to a compressed air supply device in the form of an air compressor 103, so that the electrically resistive paste or resinate paste in the storage cylinder 78 is delivered from the delivery needle 101 of the paste delivery portion 68 in the presence of compressed air supplied from the compressor 103. In the present embodiment, the delivery needle 101 functions as a paste delivery tube for delivering the electrically resistive paste.

The vertical rail 82 is secured to a horizontally movable member 108 which is moved on a horizontal rail 106 by rotation of a fine adjustment screw 104, so that the paste delivery portion 68 of the paste delivery device 70 can be moved in the right and left directions as viewed in FIG. 5. The horizontal rail 106 is fixed to a shaft portion 112 of a vertically moving device 110, which may be an air cylinder. The shaft portion 112 is vertically movable between a fully advanced and a fully retracted position. That is, the vertical movement of the paste delivery portion 68 is effected primarily by the vertically moving device 110, and the vertical position of the paste delivery portion 68 can be adjusted by rotation of the fine adjustment screw 80. In FIG. 5, reference numerals 114 and 116 denote a guide rod and a guide bushing, respectively. In the present embodiment, the vertically moving device 110 functions as a pushing device for holding an end portion of the delivery needle 101 in pressing contact with the outer circumferential surface of the glass cylinder 30.

Figure 6:
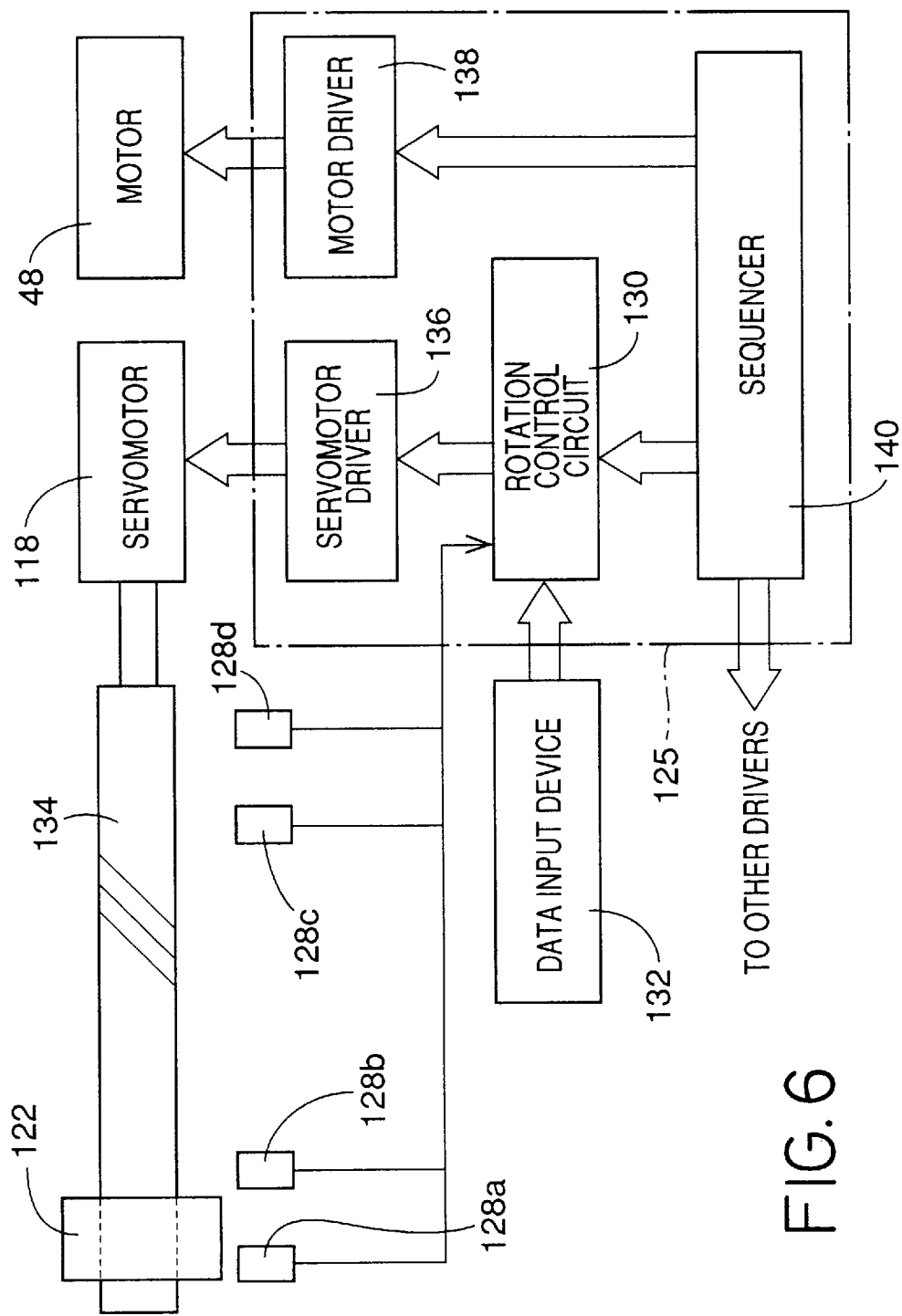
FIG. 6 is a view indicating a control system of the apparatus of FIG. 4.

The vertically moving device 110 is fixedly mounted on a movable member 122 which is movable on a rail 120 by a servomotor 118 in the direction perpendicular to the plane of FIG. 5, that is, in the axial direction of the glass cylinder 30 (in the right and left directions as viewed in FIG. 4). The drive shaft of the servomotor 118 is connected to an externally threaded shaft 134 as shown in FIG. 6, and this externally threaded shaft 134 engages an internally threaded member fixed to the movable member 122. In this arrangement, the paste delivery device 70 is movable by the servomotor 118 and the movable member 122, along the axis of the glass cylinder 30 between two positions as indicated in FIG. 4, at a feeding rate or speed corresponding to the operating speed of the servomotor 118. The servomotor 118 may be an AC servomotor whose operating speed is easily controllable. The servomotor 118 and the movable member 120 are supported by a base 124. In the present embodiment, the servomotor 118, rail 120 and movable member 122 constitute a device for moving the paste delivery device 70 in the axial direction of the glass cylinder 30.

The motor 48 of the rotating device 44, compressor 103, vertically moving device 110 and servomotor 118 are controlled by a control device 125, which comprises a central processing unit (CPU), a random-access memory (RAM) and a read-only memory (ROM). Prior to starting an operation of the film forming apparatus 38 on the glass cylinder 30, the operator of the apparatus 28 enters into the RAM various data such as those representative of the dimensions of the glass cylinder 30 and the desired characteristics of the heater roller 10 such as the desired distribution of the electrical resistance of the electrically resistive heat generating layer 34. Based on the data stored in the RAM and according to control programs stored in the ROM, the control device 125 controls the film forming apparatus 38 so as to suitably control various operating parameters in relation to the relative position between the glass cylinder 30 and the paste delivery device 70 in the axial direction of the glass cylinder 30. For example, the operating parameters to be controlled include the pressure of compressed air generated by the compressor 103, and the speed and amount of operation of the servomotor 118 and the operating speed of the motor 48. The compressed air pressure determines the delivery pressure of the resinate paste delivered from the delivery needle 101 of the paste delivery portion 68, while the operating speeds of the motors 48, 118 determine the feeding speed of the paste delivery device 70 in the axial direction of the glass cylinder 30 and the rotating speed of the glass cylinder 30. The amount of operation of the servomotor 118 determines the distance of movement of the paste applying device 42. For detecting the position of the paste delivery device 70 of the paste applying device 42 in the axial direction of the glass cylinder 30, four position sensors 128a, 128b, 128c and 128d are provided as shown in FIG. 4. The positions of these position sensors 128 in the axial direction of the glass cylinder 30 are suitably determined and changed depending upon the desired parameters represented by the data stored in the RAM as described above. In the present embodiment, the sensors 128 provide a device for detecting the relative position of the paste applying device 42 (paste delivery device 70) and the glass cylinder 30.

Referring next to the block diagram of FIG. 6, the control device 125 constitutes a part of the control system for the film forming apparatus 38. The control device includes a rotation control circuit 130 connected to a data input device 132, through which the operator enters data such as the desired operating speed of the motor 48 and the desired pattern of application of the resinate paste to the glass cylinder 30 to form the electrically resistive heat generating layer 34. The rotation control circuit 130 is further connected to the position sensors 128a–128d which are positioned along the axis of the externally threaded screw 134 connected to the servomotor 118. On the basis of the output signals of the position sensors 128 indicative of the position of the paste delivery portion 70, the rotation control circuit 130 applies a control signal to a servomotor driver 136 for activating the servomotor 118 at the controlled operating speed, so that the speed of movement of the paste delivery device 70 in the axial direction of the glass cylinder 30 is suitably controlled depending upon the position of the paste delivery device 70. On the other hand, the motor 48 is activated by a motor driver 138 also provided in the control device 125. The motor 48 is rotated at the speed represented by the data fed to the rotation control circuit 130. The operations of the rotation control circuit 130 and the motor driver 138 are controlled by a sequencer 140 also provided in the control device 125.

There will be described the manner of applying the resinate paste (electrically resistive paste) to the glass cylinder 30 in the step 2 of FIG. 3, by operating the film forming apparatus 38 under the control of the control device 124. Initially, the glass cylinder 30 and the resinate paste for forming the electrically resistive heat generating layer 34 are prepared. The prepared resinate paste is introduced into the storage cylinder 78 of the paste delivery device 70 of the paste applying device 42 of the apparatus 38. The glass cylinder 30 is set on the holder portion 46 of the rotating device 40, as shown in FIG. 4. To mount the glass cylinder 30 on the holder portion 46, the handwheel 58 is first operated to move the first slide 60 so that the distance between the driving and driven centers 54, 66 is slightly smaller than the axial length of the glass cylinder 30. Then, the second slide 62 is moved leftwards (in the direction away from the driving center 54) against the biasing action of the spring which biases the second slide 62 in the direction toward the driving center 54. While the distance of the two centers 54, 66 is slightly larger than the axial length of the glass cylinder 30, the glass cylinder 30 is positioned between and in alignment with the two centers 54, 66. Then, the force acting on the second slide 62 in the direction away from the driving center 54 is removed so that the glass cylinder 30 is held by and between the two centers 54, 66, with the biasing force of the spring acting on the driven center 66. This, the glass cylinder 30 is mounted on the holder portion 46 of the rotating device 40.

Subsequently, the paste applying device 42 is moved in the axial direction of the glass cylinder 30 to a position at which the paste delivery device 70 is positioned at one of the opposite axial ends (right end or left end as viewed in FIG. 4). Then, the paste delivery portion 68 is pivoted about the screw 98 to a suitable angular position in the vertical plane perpendicular to the axis of the glass cylinder 30. For instance, the paste delivery portion 68 is pivotedso that the delivery needle 101 is inclined by an angle of 30° with respect to the horizontal plane. After the paste delivery portion 68 is held at the desired angular position with the screw 98 fastened, the paste delivery portion 68 is moved in the right or left direction as viewed in FIG. 5, so that the tip of the delivery needle 101 is aligned with the axis of the glass cylinder 30, as indicated in FIG. 8B. Then, the operator turns on the control device 125, and manipulate the data input device 132 to enter data required for operating the apparatus 38, such as the dimensions of the glass cylinder 30, and the desired characteristics of the heater roller 10 to be manufactured, such as the desired distribution of the electrical resistance of the electrically resistive heat generating layer 34 to be formed on the glass cylinder 30. An operation of the apparatus 38 is started by turning on a suitable start switch provided on the control device 125. The apparatus 38 is controlled according to one of different control programs stored in the ROM of the control device 125, which is selected depending upon the data entered through the data input device 132. For instance, the control device 125 operates according to a routine as illustrated in the flow chart of FIG. 7 to control the apparatus 38 so as to apply the resinate paste to the outer circumferential surface of the glass cylinder 30. The routine is initiated with step Si to determine whether the start switch has been turned on. If an affirmative decision (YES) is obtained in step S1, the control flow goes to step S2 to turn on the motor 48 for rotating the glass cylinder 30 at a suitable speed, for example, at a relatively low speed of 1–3 r.p.s. (revolutions per second), and to start a timer provided in the sequencer 140 to measure the time which has passed after the rotation of the glass cylinder 30 is started. Step S2 is a step of starting the rotation of the glass cylinder 30.

When a predetermined time has passed after the timer is started, an affirmative decision (YES) is obtained in step S3, and the control flow goes to step S4 in which the control device 125 activates the vertically moving device 110 to lower the paste delivery device 70 of the paste applying device 42 toward the glass cylinder 30. The predetermined time indicated above is a time required for the rotating speed of the glass cylinder 30 to rise to the desired level, and is usually a short time, for example, several seconds. Step S4 is followed by step S5 to determine whether the paste delivery device 70 has been lowered to a predetermined lower position. To effect this determination in step S5, the delivery needle 101 of the paste delivery portion 68 may be provided with a pressure sensor for detecting a contact of the delivery needle 101 with the outer circumferential surface of the glass cylinder 30, as indicated in FIG. 8B. In this case, the downward movement of the paste delivery device 70 by the vertically moving device 110 is terminated when the needle 101 contacts the outer circumferential surface of the glass cylinder 30.

Alternatively, the determination in step S5 may be effected by calculating the required distance of downward movement of the paste delivery device 70 to the predetermined position on the basis of the outside diameter of the glass cylinder 30 which has been entered through the data input device 132, and comparing the actual movement distance of the shaft portion 112 of the device 110 with the calculated required distance.

When an affirmative decision (YES) is obtained in step S5, the control flow goes to step S6 in which the control device 125 turns on the servomotor 118 to move the movable member 122 for feeding the paste delivery device 70 in the axial direction of the glass cylinder 30 from the predetermined one of the opposite axial ends of the glass cylinder 30. Step S6 is followed by step S7 in which the control device 125 determines whether the paste delivery device 70 has reached a predetermined paste application start position at which the application of the resinate paste to the glass cylinder 30 is initiated. This paste application start position may be detected by the position sensor 128*a* or 128*d* located near the axial end of the glass cylinder 30. Steps S6 and S7 are repeatedly implemented until an affirmative decision (YES) is obtained in step S7. In other words, the paste delivery device 70 is fed without 5 application of the resinate paste as long as a negative decision (NO) is obtained in step S7. When the affirmative decision (YES) is obtained in step S7, step S8 is implemented to activate the air compressor 103 for supplying the storage cylinder 78 with compressed air having a pressure of about 1.8 kg/cm$^2$, for example, so that the resinate paste is delivered from the tip of the delivery needle 101. Step S8 is a step of starting the delivery of the resinate paste from the paste delivery device 70. With the rotation of the glass cylinder 30 and the feeding movement of the paste delivery device 70 in the axial direction of the glass cylinder 30, the tip of the delivery needle 101 is moved on the outer circumferential surface of the glass cylinder 30, so as to describe a helical path, whereby the resinate paste applied to the outer circumferential surface of the glass cylinder 30 has a a helical pattern.

Figure 8A:
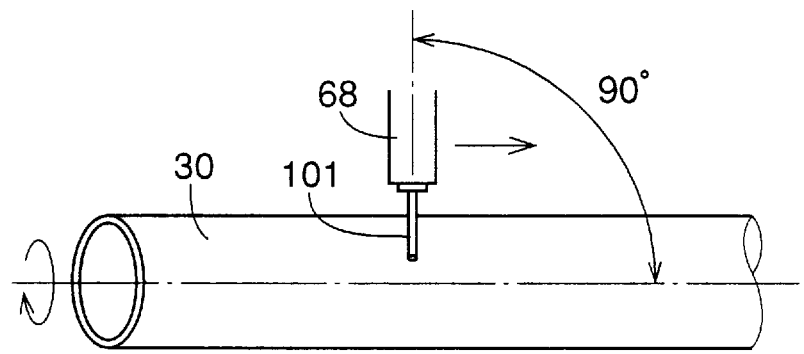
FIG. 8A is a view corresponding to that of FIG. 4, for explaining a positional relationship between a glass cylinder which is coated with an electrically resistive paste to form the heat generating layer and a delivery needle of a paste delivery portion of a paste delivery device of the apparatus, when the paste is applied from the needle to the glass cylinder.

When the paste cylinder device 70 is located at the predetermined position as a result of the downward movement in step S4, the axis of the paste delivery portion 68 carrying the delivery needle 101 is perpendicular to the axis of the glass cylinder 30, as indicated in FIG. 8A, while at the same time is inclined by a suitable angle θ1 (e.g., about 50°) with respect to a normal line of the circumference of the glass cylinder 30 at the point of intersection between the axis of the paste delivery portion 68 and the circumference of the glass cylinder 30, as indicated in FIG. 8B. The axis of the paste delivery portion 68 is inclined with respect to the above-identified normal line in the direction opposite to the rotating direction of the glass cylinder 30. In this condition, the tip of the delivery needle 101 is located on the vertical line v passing the axis O of the glass cylinder 30, and the end portion of the delivery needle 101 is pressed onto the outer circumferential surface of the glass cylinder 30 and thereby bent against its elastic force, so as to extend in the rotating direction of the glass cylinder 30, whereby the end portion of the delivery needle 101 is inclined by a suitable angle θ2 (e.g., about 20°) with respect to a tangent line of the circumference of the glass cylinder 30 at the point of contact of the needle 101 with the outer circumferential surface of the glass cylinder 30, that is, with respect to the horizontal plane.

Step S8 is followed by step S9 to determine whether the position of the paste delivery device 70 in the axial direction of the glass cylinder 30 is detected by any one of the four position sensors 128. If an affirmative decision (YES) is obtained in step S9, the control flow goes to step S10 in which the feeding speed of the paste delivery device 70 is controlled to a value corresponding to the detected position of the device 70. Steps S6, S9 and S10 cooperate to provide a step of moving the paste delivery device 70 in the axial direction of the glass cylinder 30. The feeding speed (m/min) of the paste delivery device 70 is controlled as indicated in the graph of FIG. 9, for example.

Figure 9:
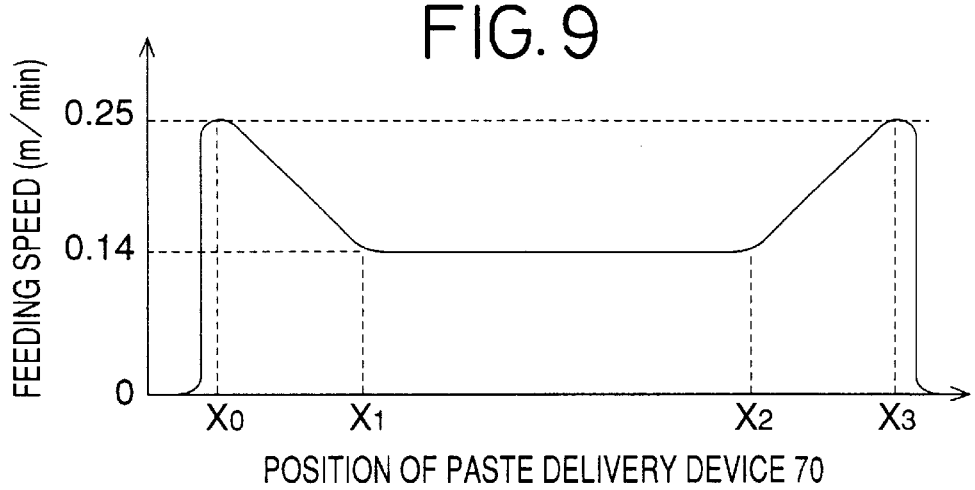
FIG. 9 is a view indicating a pattern of change in the speed of movement of the paste delivery device of the apparatus in the axial direction of the glass cylinder when the glass cylinder is coated with the paste.

In FIG. 9, X0–X4 represent the positions of the paste delivery device 70 in the axial direction of the glass cylinder 30, which are detected by the position sensors 128a–128d shown in FIGS. 4 and 6, respectively. The feeding speed of the paste delivery device 70 is increased from zero to about 0.25 m/min while the device 70 is moved from the start position to the position X0. While the device 70 is moved from the position X0 to the position X1, the feeding speed is continuously lowered to about 0.14 m/min. The feeding speed is held constant at about 0.14 m/min while the device 70 is moved from the position X1 to the position X2. While the device 70 is moved from the position X2 to the position X3, the feeding speed is continuously increased from about 0.14 m/min back to about 0.25 m/min. Thus, the feeding speed of the paste delivery device 70 is controlled to be comparatively high during movements thereof along the 5 opposite axial end portions of the glass cylinder 30, and comparatively low during a movement thereof along the axially intermediate portion of the glass cylinder 30. In this respect, it is noted that the rotating speed of the glass cylinder 30 is kept constant during the movement of the device 70 over the entire length of the glass cylinder 30.

Figure 10:
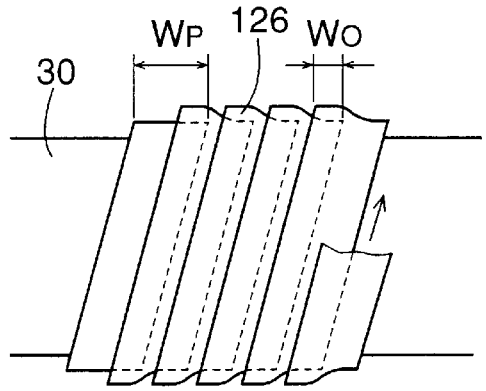
FIG. 10 is a view for explaining a manner in which the paste is applied to the outer circumferential surface of the glass cylinder.

While the paste delivery device 70 is fed at the speed controlled as described above and indicated in the graph of FIG. 9, the tip of the delivery needle 101 is moved on the outer circumferential surface of the glass cylinder 30, so as to take a helical path on the circumferential surface so that the applied resinate paste indicated at 126 in FIG. 10 has a corresponding helical pattern such that the adjacent two turns of the resinate paste 126 overlap each other over an axial dimension Wo. "Wp" in FIG. 10 represents the axial width of each turn of the resinate paste 126. In the present film forming apparatus 38 wherein the feeding speed of the paste delivery device 70 or delivery needle 101 is changed as described above with the rotating speed of the glass cylinder 30 kept constant, the pitch of the helical path of the delivery needle 101 in the axial direction of the glass cylinder 30 is accordingly changed. The amount of the resinate paste applied per unit length of the glass cylinder 30 is comparatively small when the feeding speed of the delivery needle 101 is comparatively high, and is comparatively large when the feeding speed is comparatively low. Therefore, the pattern of change in the feeding speed of the paste delivery device 70 as indicated in FIG. 9 causes the resinate paste to be applied to the glass cylinder 30 such that the applied resinate paste has a comparatively small thickness on the opposite axial end portions of the glass cylinder 30 at which the feeding speed of the device 70 is comparatively high, and a comparatively large thickness on the axially intermediate portion of the glass cylinder 30 at which the feeding speed is comparatively low.

The feeding speeds of the paste delivery device 70 at the positions X0–X3, the rotating speed of the glass cylinder 30 and the delivery pressure of the resinate paste are suitably determined to obtain the desired thickness of the electrically resistive heat generating layer 34 formed from the applied paste. The pattern of change in the feeding speed of the device 70 as indicated in FIG. 9 by way of example ensures a continuous film of the resinate paste 126 even in the opposite axial end portions of the glass cylinder 30, for example, even at the positions X0 and X3 at which the feeding speed is the highest. This continuous film is obtained since the individual turns of the resinate paste 126 expand in the axial direction of the glass cylinder 30. Although the resinate paste 126 applied in the helical pattern as shown in FIG. 10 has a relatively deep helical groove and is not smooth, the film of the applied resinate paste 126 actually has a considerably smooth surface without a deep helical groove, owing to a relatively high degree of fluidity, which permits the individual turns of the paste to flow in the axial direction of the glass cylinder 30.

Step S10 is followed by step S11 to determine whether the application of the resinate paste to the outer circumferential surface of the glass cylinder 30 is terminated. If a negative decision (NO) is obtained in step S11, the control flow returns to step S9. As long as the negative decision (NO) is obtained in step S11, steps S9–S11 are repeatedly implemented to continuously feed the paste delivery device 70 and delivery the resinate paste. When the device 70 has reached a predetermined paste application end position corresponding to the other axial end portion of the glass cylinder 70, an affirmative decision (YES) is obtained in step S11. That is, the affirmative decision is obtained in step S11 when the outer circumferential surface of the glass cylinder 30 has been coated with the resinate paste 126 over the predetermined length. This determination is effected on the basis of the output signal of the position sensor 128d. That is, the resinate paste is applied to the glass cylinder 30 over the length between the positions of the position sensors 128a and 128d, in the present embodiment.

When the affirmative decision (YES) is obtained in step S1, the control flow goes to step S12 to turn off the air compressor 103 and start a timer for measuring the time lapse after the termination of application of the resinate paste. As a result, the supply of the compressed air to the storage cylinder 78 of the paste delivery device 70 is stopped, whereby the delivery of the resinate paste from the delivery needle 101 is stopped. Step S12 is followed by step S13 to turn off the servomotor 118 to stop the feeding movement of the paste delivery device 70. Then, the control flow goes to step S14 to activate the vertically moving device 110 to move up the paste delivery device 70 for thereby moving the delivery needle 101 away from the outer circumferential surface of the glass cylinder 30. Step S14 is followed by step S15 to determine whether the paste delivery device 70 has been moved up back to the predetermined upper position. If an affirmative decision (YES) is obtained in step S15, step S16 is implemented to determine whether a predetermined time has passed after the termination of application of the resinate paste, namely, after the affirmative decision (YES) is obtained in step S11. This predetermined time (e.g., several minutes) is determined to permit the resinate paste applied to the outer circumferential surface of the glass cylinder 30 to be smoothed so as to reduce a thickness variation of the applied resinate paste film to a tolerable value. If an affirmative decision (YES) is obtained in step S16, the control flow goes to step S17 to turn off the motor 48 to stop the rotation of the glass cylinder 30. Then, the operator of the apparatus 38 removes the glass cylinder 30 from the holder portion 46 of the rotating device 40. Thus, the step 2 (FIG. 3) to apply the resinate paste to the glass cylinder 30 is completed.

Figure 11:
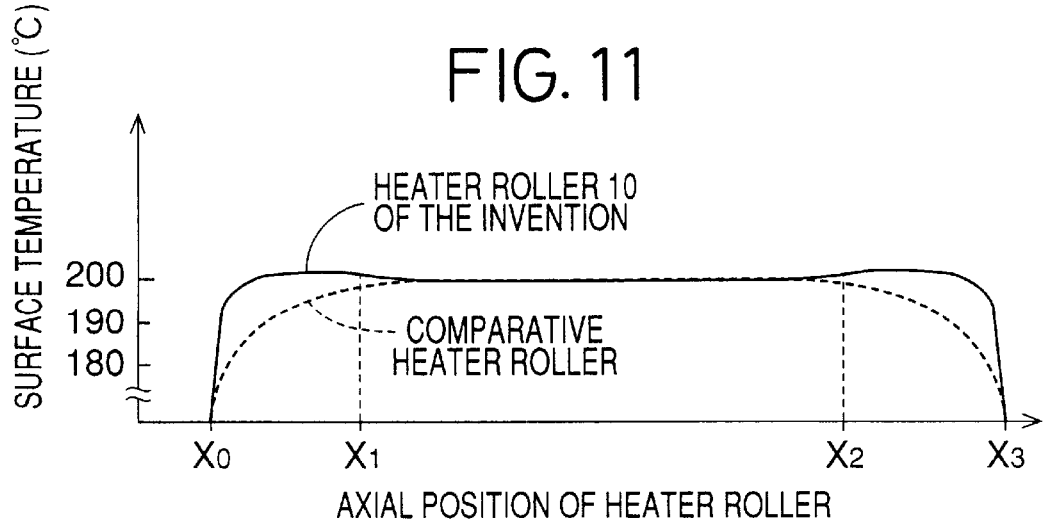
FIG. 11 is a view indicating the temperature distribution of the heater roller of FIG. 1 as compared with that of a heater roller manufactured according to the conventional method.

The temperature of the heater roller 10 manufactured as described above was measured at various axial positions during energization of the electrically resistive heat generating layer 34 whose thickness varies in the axial direction. The graph of FIG. 11 indicates the distribution of the temperature of the present heater roller 10, together with the distribution of a conventional heater roller having an electrically resistive heat generating layer whose thickness is constant over the entire length. The temperature was measured at the outer circumferential surface of the heater rollers by a thermocouple, after energization of the heat generating layer with electric power of about 250 W for ten seconds. It will be understood from the graph that the present heater roller 10 has a considerably reduced variation in the surface temperature in the axial direction, namely, a highly even distribution of the surface temperature, as compared with those of the conventional heater roller.

In the present embodiment, step S2 is the step of rotating the glass cylinder 30 about its axis, and step S8 is the step of delivering the resinate paste (electrically resistive paste including MOC) from the delivery needle 101 onto the outer circumferential surface of the glass cylinder 30 while the glass cylinder 30 is rotated. Further, steps S6, S9 and S10 cooperate to be the step of feeding the paste delivery device 70 and the glass cylinder 30 relative to each other in the axial direction of the glass cylinder 30 such that the feeding speed is controlled in relation to the axial position as indicated in the graph of FIG. 9. The pattern of change in the feeding speed of the paste delivery device 70 is determined or controlled within a range of the feeding speed that permits the formation of the resinate paste which is continuous in the axial direction of the glass cylinder 30. In the present embodiment, the control device 125 controls the servomotor 118 to move the paste delivery device 70 and the glass cylinder 30 relative to each other so that the feeding speed of the paste delivery device 70 is changed in a suitable pattern in relation to the relative position of the device 70 and the glass cylinder 30 in the axial direction of the glass cylinder 30, so as to form the continuous film of the resinate paste on the outer circumferential surface of the glass cylinder 30.

In the above arrangement, the tip of the delivery needle 101 of the paste delivery device 70 is moved on the outer circumferential surface of the glass cylinder 30 so as to take a helical path so that the resinate paste delivered from the delivery needle 101 forms the film which is continuous in the axial direction of the glass cylinder 30. The amount of the resinate paste delivered to the glass cylinder 30 per unit length varies with a change in the pitch of the helical path as the relative speed of the device 70 and the glass cylinder 30 is changed as described above, whereby the thickness of the resinate film applied to the glass cylinder 30 is changed with the relative speed. Described more particularly, the thickness of the resinate film is made comparatively small in the opposite axial end portions of the glass cylinder 30, and comparatively large in the axially intermediate portion of the glass cylinder 30. Since the resinate paste maintains a suitable degree of fluidity immediately after the application onto the glass cylinder 30, the applied resinate paste flows in the direction of reducing a thickness variation at the portions of the glass cylinder 30 at which the feeding speed of the paste delivery device 70 is changed. Accordingly, the thickness of the film of the applied resinate paste tends to change relatively continuously.

Since the film of the resinate paste has a continuously changing thickness, the electrically resistive heat generating layer 34 formed from the resinate paste film on the outer circumferential surface of the glass cylinder has also a continuously changing thickness. Accordingly, the heat generating layer 34 whose electrical resistance has a desired distribution in the axial direction by suitable thickness adjustment does not suffer from stepped portions due to sudden change of the thickness, contrary to the heat generating layer whose thickness is locally increased by additional application of the resinate paste to the initially applied paste according to the conventional method. The heater roller 10 manufactured according to the present embodiment not only has a desired distribution of the electrical resistance of the electrically resistive heat generating layer, but also assures even distribution of the force generated at the pressure nip between the heater and pressure rollers over the entire length of the rollers.

In the present embodiment, the vertically moving device 110 is operated to press the end portion of the delivery needle 101 of the paste delivery portion 68 onto the outer circumferential surface of the glass cylinder 30 while the glass cylinder 30 held by the holding portion 46 is rotated by the drive portion 44 of the rotating device 40. Then, the resinate paste is delivered from the delivery needle 101 onto the outer circumferential surface of the glass cylinder 30 while the delivery needle 101 is moved by the servomotor 118 in the axial direction of the glass cylinder 30. Thus, the delivery needle 101 is moved helically on the outer circumferential surface of the glass cylinder 30 while at the same time delivers the resinate paste in a helical pattern such that the adjacent turns of the helically applied paste partially overlap each other as indicated in FIG. 10, so as to form a cylindrical film which is continuous in the circumferential direction as well as in the axial direction of the glass cylinder 30. Accordingly, the electrically resistive heat generating layer 34 is formed continuously in the circumferential direction of the glass cylinder 30, and has an even temperature distribution in the circumferential direction.

It is also noted that the delivery needle 101 of the paste delivery portion 68 of the paste delivery device 70 has bending elasticity, which permits the end portion to be bent to form the predetermined inclination angle θ2 with respect to the horizontal plane and to be held pressed onto the outer circumferential surface of the glass cylinder 30 such that the tip of the needle 101 lies on the vertical line passing through the axis of the glass cylinder 30. The elasticity of the needle 101 permits its end portion to stably follow the circumference of the glass cylinder 30, even where the point of contact changes in the vertical 4direction due to out-of-roundness and warpage of the glass cylinder 30 or due to a variation in the initial position of the needle 101. Accordingly, the operating condition of the needle 101 (e.g., paste delivery angle and pressing force acting on the glass cylinder 30) can be held substantially constant irrespective of the fluctuating factors indicated above. Therefore, the amount of the resinate paste per unit length of the glass cylinder 30 is determined solely by the feeding speed of the paste delivery device 70, whereby the distribution of the thickness of the electrically resistive heat generating layer 34 in the circumferential direction of the glass cylinder 30 can be controlled as needed to assure desired distribution of the electrical resistance of the layer 34 and therefore even temperature distribution of the layer 34.

Further, the rotation of the glass cylinder 30 for several minutes even after the termination of application of the resinate pate 126 is effective to reduce the thickness variation due to helical coating and the gravity.

In the present embodiment, the electrically resistive heat generating layer 34 is formed by applying the resinate paste to the glass cylinder 30 and drying and firing the resinate paste film, so that the layer 34 has a considerably high degree of surface smoothness, and has a relatively high resistance to thermal stresses in use, which may cause electrical disconnection. Described in detail, the resinate contained in a liquid or paste consists of exetremely fine particles whose size is so small to permit chemical bonding of metal components and organic substances, so that the fired resinate provides a thin dense metal film structure having a high degree of surface smoothness. Since the atoms of the metal components are bonded together in the electrically resistive heat generating layer 34 formed from the resinate film, the layer 34 is unlikely to suffer from electrical disconnection due to thermal stresses during energization thereof, and is durable even where the thickness is relatively small. In the conventional thick-film material for an electrically resistive heat generating layer, the grains of the metal components are bonded together by glass components, and the formed heat generating layer has a comparatively low resistance to thermal stresses, so that the heat generating layer is not sufficiently durable where the thickness is several microns or smaller.

Other embodiments of the present invention will be described. In the following description, the same reference numerals as used in the first embodiment will be used to identify the corresponding elements.

Figure 12:
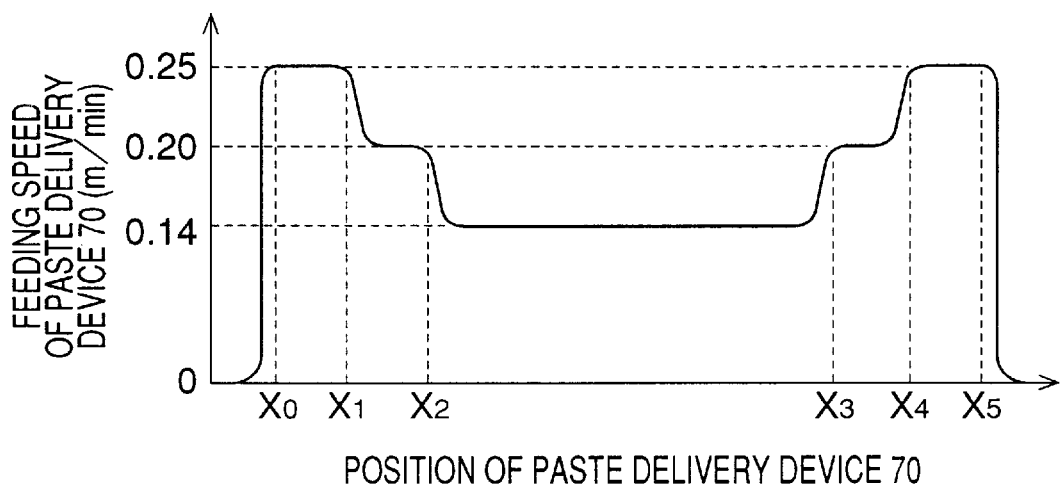
FIG. 12 is a view indicating another pattern of change in the speed of movement of the paste delivery device of the apparatus of FIG. 4.

In the second embodiment, the feeding speed of the paste delivery device 70 is changed in relation to the axial position of the glass cylinder 30, as indicated in the graph of FIG. 12. This embodiment is possible even where the operating speed of the servomotor 118 cannot be changed continuously, but can be changed in steps. In the present embodiment, the feeding speed of the paste delivery device 70 is changed in three steps. Namely, the feeding speed is about 0.25 m/min between the positions X0 and X1 and between the positions X4 and X5, about 0.20 m/min between the positions X1 and X2 and between the positions X3 and X4, and about 0.14 m/min between the positions X2 and X3. The present embodiment requires six position sensors 128 corresponding to the positions X0–X5.

Figure 13:
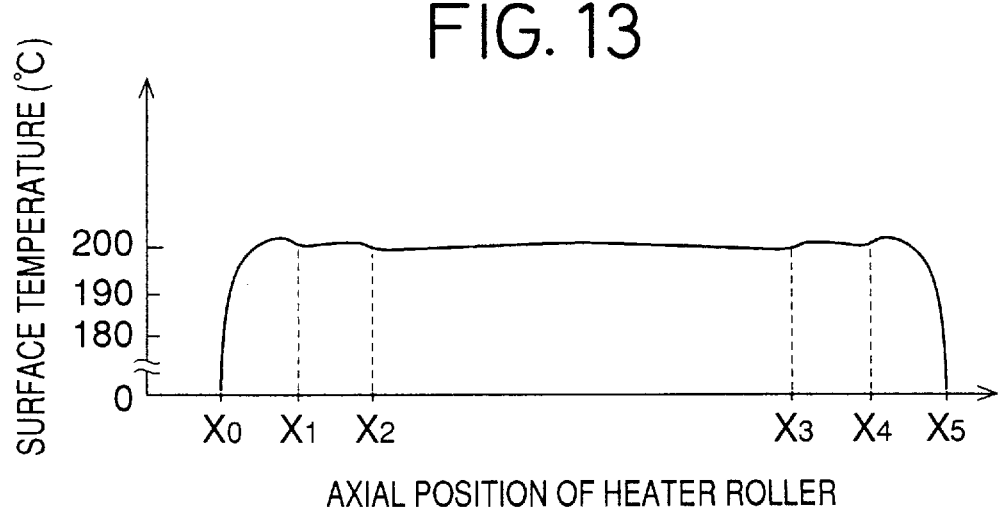
FIG. 13 is a view indicating the temperature distribution of the heater roller manufactured according to the pattern of FIG. 12.

The graph of FIG. 13 indicates an distribution of the surface temperature of the electrically resistive heat generating layer 34 formed from the resinate paste which is applied while the feeding speed of the paste delivery device 70 is controlled as shown in FIG. 12. The surface temperature was measured in the same manner as in the first embodiment. It will be understood from the graph of FIG. 13 that the surface temperature of the layer 34 has a sufficiently even distribution in the axial direction, as in the first embodiment. Therefore, the present second embodiment does not require the servomotor 118 to be adapted such that its operating speed is continuously variable. In other words, the present invention provides an advantage in the temperature distribution of the heat generating layer 34 even where the operating speed of the motor to feed the paste delivery device 70 can be changed only in steps.

In the first and second embodiments described above, the resinate paste is applied to the glass cylinder 30 in one operation while the paste delivery device 70 is fed in the axial direction of the glass cylinder 30 from one axial end of the cylinder 30 to the other axial end at a speed controlled to ensure the desired distribution of the electrical resistance of the electrically resistive heat generating layer 34. However, two films of the resinate paste may be applied to form the heat generating layer 34, as indicated in the flow chart of FIG. 14. In this third embodiment, a relatively thin first film of the electrically resistive heat generating layer 34 is formed with a constant thickness (e.g., about 0.8 $\mu$m) in step 2-1, step 3-1 and step 4-1, and the axial distribution of the electrical resistance of the first layer is measured in step 5'. Subsequently, a second film of the heat generating layer 34 is formed in step 2-2, step 3-2 and step 4-2, with a thickness controlled depending upon the distribution of the electrical resistance of the first film. Then, steps 5-8 are implemented to form the heater roller 10 with the electrically resistive heat generating layer 34. In the present third embodiment, steps 4-1 and 4-2 cooperate to be the step of heat-treating the resinate paste to form the heat generating layer 34.

Figure 7:
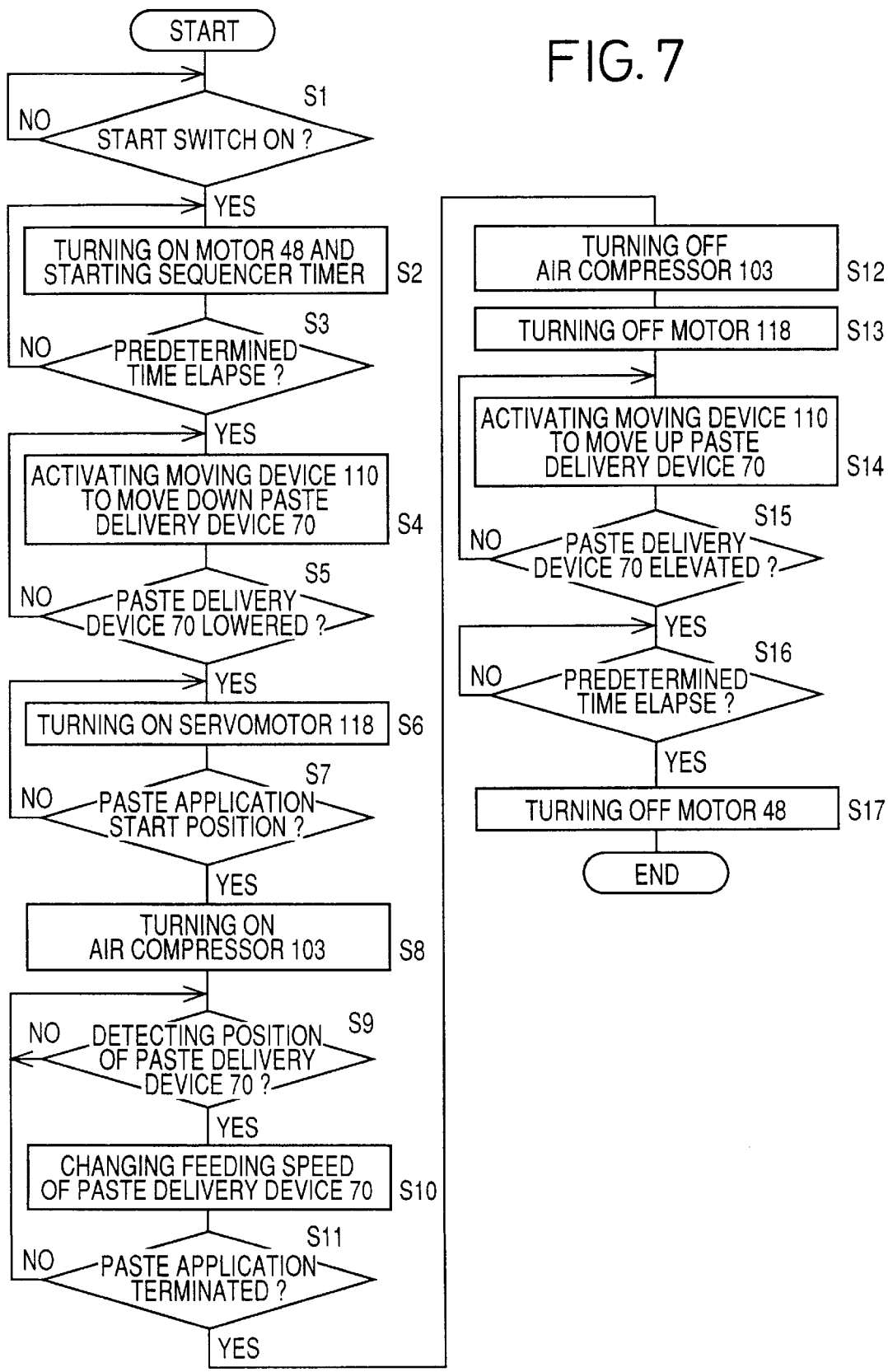
FIG. 7 is a flow chart illustrating an operation of the control system to control the apparatus.
Figure 8B:
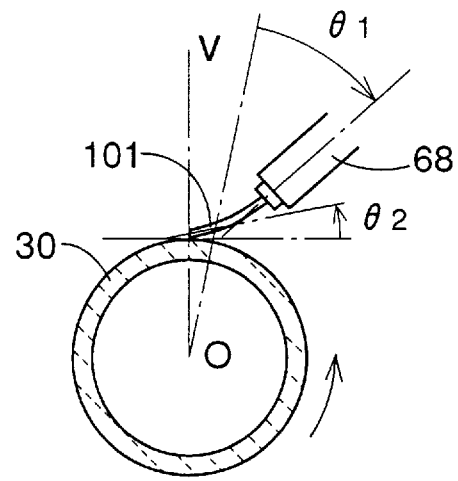
FIG. 8B is a view corresponding to that of FIG. 5, for explaining the positional relationship between the glass cylinder and the delivery needle.

The above step 2-2 of forming the second resinate paste film is implemented to apply the resinate paste according to the routine illustrated in the flow chart of FIG. 7. However, the step 2-1 of forming the first resinate paste film is implemented according to a modified routine which is different from that of FIG. 7 in that the modified routine does not include the steps S9 and S10. In the step 2-2, the feeding speed of the paste delivery device 70 is changed in relation to the axial position of the glass cylinder 30, as in the first embodiment of FIG. 7. In the step 2-1, the paste delivery device 70 is fed at a predetermined constant speed. In the present third embodiment, step s6 in the step 2-1 is the first feeding step, while steps S6, S9, S10 in the step 2-2 is the second feeding step.

Figure 15:
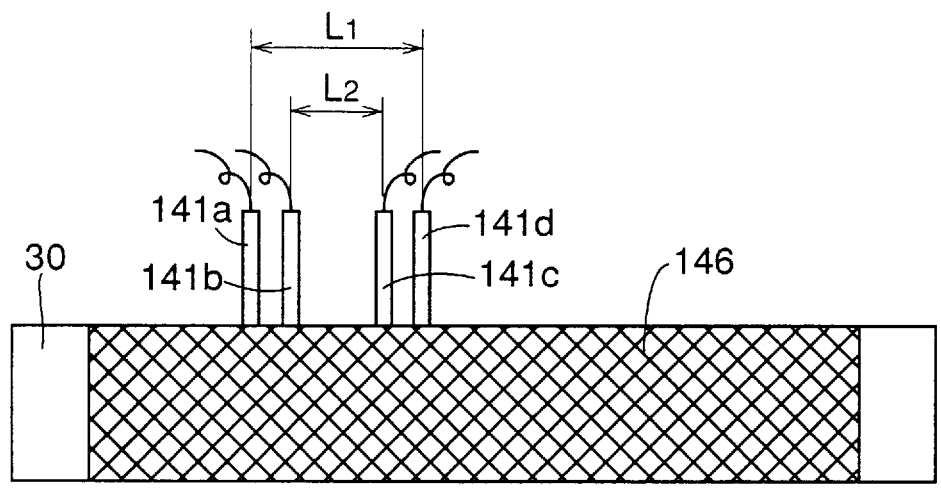
FIG. 15 is a view for explaining a method of measuring the distribution of the electrical resistance of the electrically resistive heat generating layer.

In the steps 2-1, 3-1 and 4-1, the film of the applied resinate paste having a comparatively small constant thickness is dried and heat-treated into a thin metallic film, that is, the first film of the electrically resistive heat generating layer 34. In the step 5', the electrical resistance of the first film of the layer 34 is measured at different axial positions, by a suitable measuring device equipped with four probes. For instance, four probes 141a–141d of the measuring device are arranged along the axis of the glass cylinder 30, as shown in FIG. 15. A predetermined amount of electric current is applied between the two outer probes 141a and 141d, and an electric current between the two inner probes 141b and 141c is measured. This measurement is repeated at a predetermined interval along the entire axial length of the first film of the layer 34, to obtain the axial distribution of the electrical resistance values of the first film. A distance L1 between the two outer probes 141a, 141d is about 30.5 mm, while a distance L2 between the two inner probes 141b, 141c is about 28.5 mm. The distance L2 is determined to be sufficiently smaller than the perimeter of the outer circumferential surface of the glass cylinder 30, so as to reduce an influence of an electric current flowing in the circumferential direction of the glass cylinder 30, for thereby improving the accuracy of measurement of the electrical resistance of the first film of the heat generating layer 34. In the present third embodiment, the glass cylinder 30 has an outside diameter of about 12 mm, and the perimeter is therefore about 37 mm. The measuring interval is equal to the distance L2 (about 28.5 mm), for example.

Figure 16:
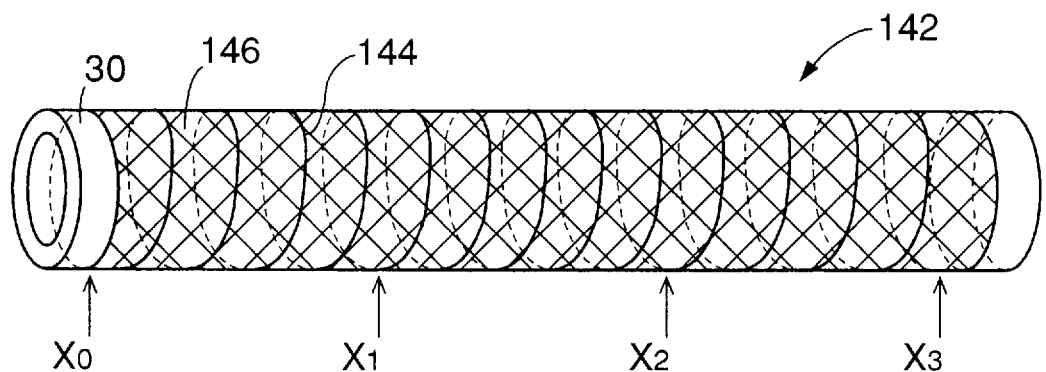
FIG. 16 is a view for explaining a pattern of application of the paste to form a second layer according to the method of FIG. 14 practiced by the apparatus of FIG. 4.

In the step 2-2, the feeding speed of the paste delivery device 70 is changed in relation to the axial position of the glass cylinder 30, as in the first embodiment of FIG. 9, depending upon the axial distribution of the electrical resistance of the already formed first film of the layer 34, such that the feeding speed is comparatively high in the portions of the first film wherein the electrical resistance is comparatively low, and comparatively low in the portions wherein the electrical resistance is comparatively high. For instance, the feeding speed is about 1.75 m/min at the positions X0 and X3, and about 0.90m/min between the positions X1 and X2. These feeding speeds are lower in the present third embodiment than in the first embodiment. As a result, the pitch of the helical path described by the tip of the delivery needle 101 is comparatively large (e.g., about 9.8 mm) at or near the positions X0 and X3, and is comparatively small (e.g., about 5.0 mm) between the positions X1 and X2, as schematically indicated in FIG. 16 which shows a heater roller 142 on which the second film 144 of the layer 34 is formed on the first film 146. In this embodiment, the second film 144 has a small helical gap, and the layer 34 has a minute helical groove in its circumferential surface.

Figure 17:
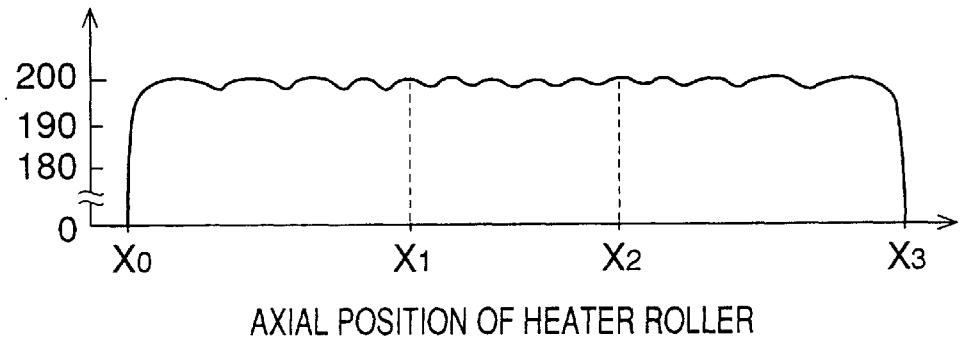
FIG. 17 is a view indicating the temperature distribution of the heater roller manufactured according to the method of FIG. 16.

The surface temperature of the heater roller 142 with the electrically resistive heat generating layer 34 thus formed was measured at various axial positions, in the same manner as in the first embodiment. The graph of FIG. 17 shows a distribution of the measured surface temperature in the axial direction. Since the heat generating layer 34 has the minute helical groove and a consequent variation in the thickness in the axial direction, the surface temperature of the heater roller has a variation following the variation of the thickness of the layer 34. However, the variation of the surface temperature is not so large as to adversely influence an operation of an electrostatic copying machine in which the heater roller is used. In other words, the electrically resistive heat generating layer 34 consisting of a lamination of the first and second films formed as described above is practically satisfactory.

In the present third embodiment, step S2 is the step of rotating the glass cylinder 30 about its axis, and step S8 is the step of delivering the resinate paste (i.e., an electrically resistive paste including a metal-organic compound) onto the outer circumferential surface of the glass cylinder 30 through the delivery needle 101 while the glass cylinder 30 is rotated. Step S6 in the step 2-1 is the first feeding step of feeding the paste delivery device 70 and the glass cylinder 30 relative to each other in the axial direction of the glass cylinder 30 at a predetermined constant speed so that the continuous first resinate paste film is formed on the outer circumferential surface of the glass cylinder 30. Further, steps S6, S9 and S10 in the step 2-2 cooperate to be the second feeding step of feeding the paste delivery device 70 and the glass cylinder 30 relative to each other in the axial direction of the glass cylinder 30 such that the feeding speed is controlled in relation to the axial position, so that the second resinate paste film is formed on the first film of the heat generating layer 34. The steps 4-1 and 4-2 cooperate to be the step of heat-treating the resinate paste into the electrically resistive heat generating layer 34 consisting of a relatively thin metallic film.

The total thickness of the electrically resistive heat generating layer 34 is increased at its portions where the resinate paste is additionally applied in the step 2-2, and the electrical resistance is accordingly reduced at these portions. Since the pitch of the helical path taken by the delivery needle 101 during feeding thereof relative to the glass cylinder 30 is changed as the relative feeding speed is changed, the axial distribution of the electrical resistance can be controlled by controlling the relative feeding speed of the needle 102 and the glass cylinder 70. Since the second film of the heat generating layer 34 is a thin metallic film formed from the second resinate paste film containing metal-organic compound, the total thickness of the layer 34 is comparatively small even at the portions at which the resinate paste is additionally applied in step 2-2.

In the third embodiment wherein the relative feeding speed of the paste delivery device 70 and the glass cylinder 30 is changed in relation to the relative position in the second feeding step, the heat generating layer 34 can be given the desired distribution of the electrical resistance, and the second resinate paste film formed in the step 2-2 will not cause considerably stepped portions on the surface of the heat generating layer 34. Thus, the present third embodiment also permits not only the desired distribution of the electrical resistance of the heat generating layer 34, but also even distribution of the force generated at the pressure nip between the heater roller 142 and the pressure roller during use. The partial or local lamination of the first and second films of the layer 34 is effective to reduce the drawback of the conventional heater roller having a single electrically resistive film as the heat generating layer.

Further, the third embodiment is adapted to measure the axial distribution of the electrical resistance of the electrically resistive heat generating layer 34 in the step 5', and the feeding speed of the paste delivery device 70 is controlled depending upon the measured axial distribution of the electrical resistance in steps S6, S9 and S10 of the step 2-2. Accordingly, an axial variation in the electrical resistance of the first film 146 of the layer 34 can be reduced or eliminated by the second film 144. In this respect, the pattern of change in the feeding speed of the device 70 as shown in FIG. 9 is replaced by a pattern so that the feeding speed is comparatively high where the electrical resistance of the first film 146 is comparatively low, and is comparatively low where the electrical resistance of the first film 146 is comparatively high.

Figure 14:
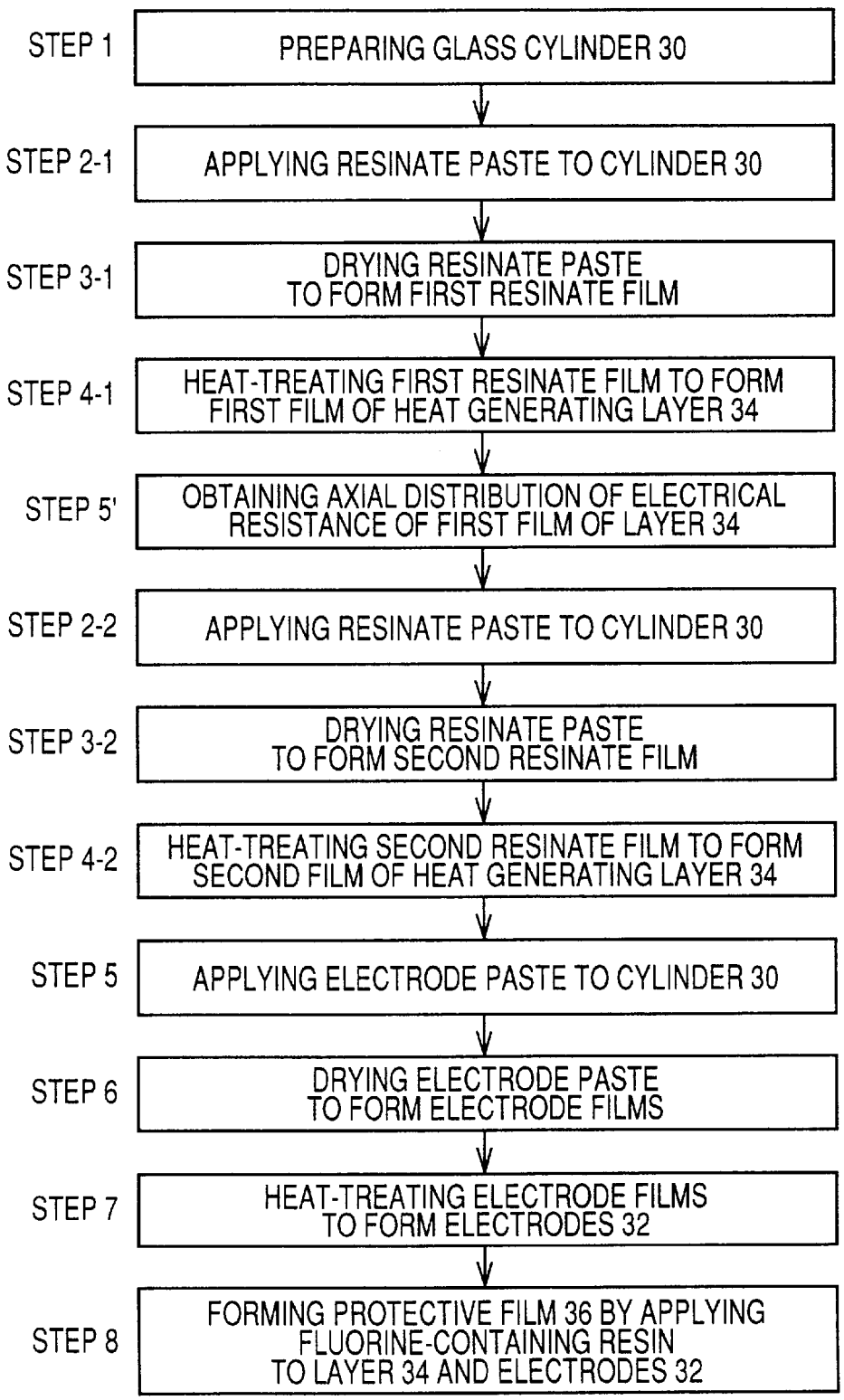
FIG. 14 is a flow chart illustrating a method according to another embodiment of this invention.
Figure 18:
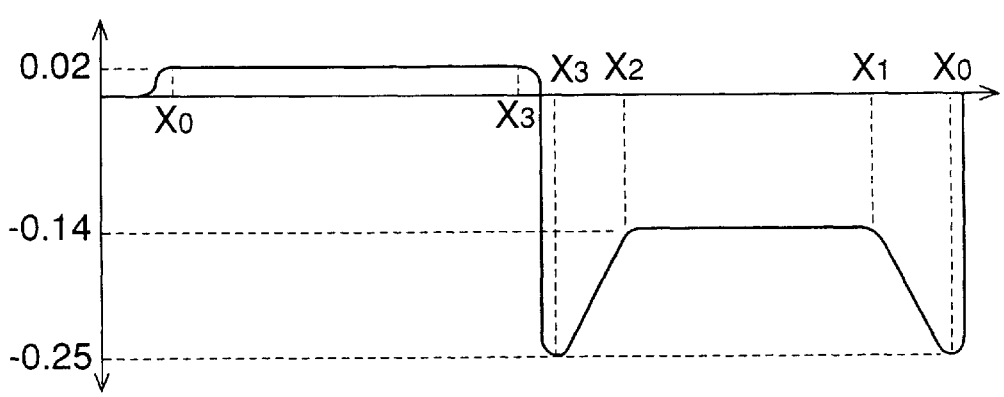
FIG. 18 is a view for explaining a further pattern of change in the speed of movement of the paste delivery device of the apparatus of FIG. 4.

Referring next to the graph of FIG. 18, there will be described a pattern of change in the feeding speed of the paste delivery device 70 when the device 70 is fed in the steps 2-1 and 2-2 to manufacture the heater roller 142 according to a fourth embodiment of the invention. In the graph of FIG. 18, the axial position of the glass cylinder 30 is taken along the horizontal axis, while the feeding speed is taken along the vertical axis such that the speed is positive when the device 70 is moved in the direction from the position X0 toward the position X3. In the present fourth embodiment, the first resinate paste film for the first film 146 is applied during a movement of the paste delivery device 70 from the position X0 toward the position X3, and the second resinate paste film for the second film 144 is formed during a movement of the device 70 in the opposite direction from the position X3 toward the position X0. Namely, the step 2-1 of FIG. 14 is followed by the step 2-2 without the steps 3-1, 4-1 and 5' being implemented. That is, the direction of movement of the device 40 is reversed when the first resinate film for the first film 146 has been formed, so that the second resinate film for the second film 144 is formed immediately after the first resinate film is formed.

In the fourth embodiment of FIGS. 18, the paste delivery device 70 is reciprocated in the axial direction of the glass cylinder 30 in the step 2-1 (first feeding step) and the step 2-2 (second feeding step), whereby the time required for applying the resinate paste to the glass cylinder 30 is reduced, by elimination of a non-productive feeding time of the device 70.

Figure 19:
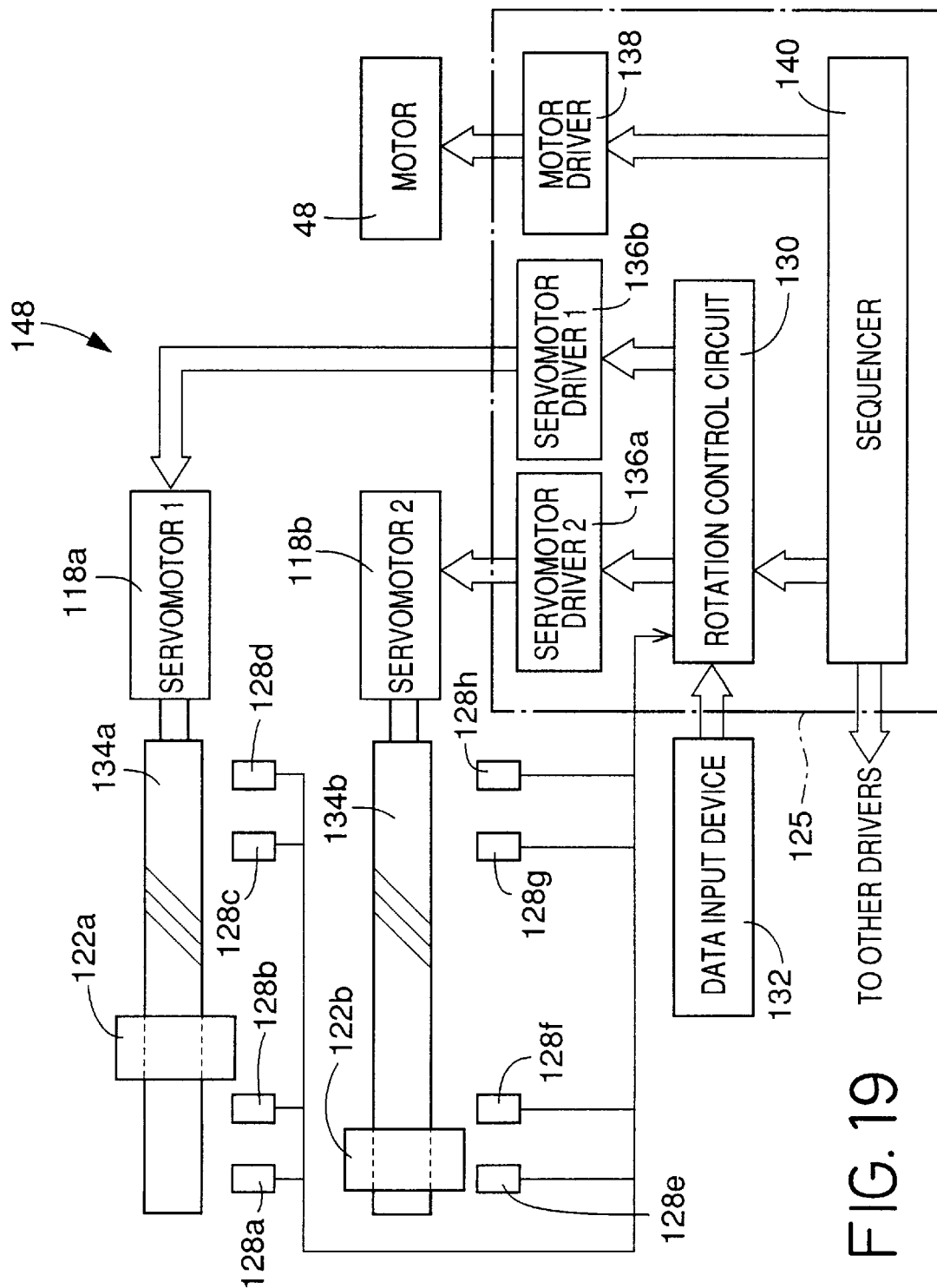
FIG. 19 is a view corresponding to that of FIG. 18, showing a control system of an apparatus according to another embodiment of the invention.

Referring next to FIG. 19 corresponding to FIG. 6, there is shown a film forming apparatus 148 equipped with two paste applying devices 42 each constructed as shown in FIGS. 4 and 5. In this fifth embodiment, the rotation control circuit 130 is connected to two servomotor drivers 136a, 136b, which are connected to two servomotors 118a, 118bthat are provided in the respective two paste applying devices 42, 42. The output shafts of these two servomotors 118a, 118b are connected to respective externally threaded shafts 134a, 134b for moving respective movable members 122a, 122b of the paste applying devices 42, 42 in the right and left directions as viewed in FIG. 4. Each of these two movable members 122a, 122b supports the paste delivery device 70 having the paste delivery portion 68. In this embodiment, the paste delivery devices 70 of the two paste applying devices 42 operate on the same glass cylinder 30.

Figure 20:
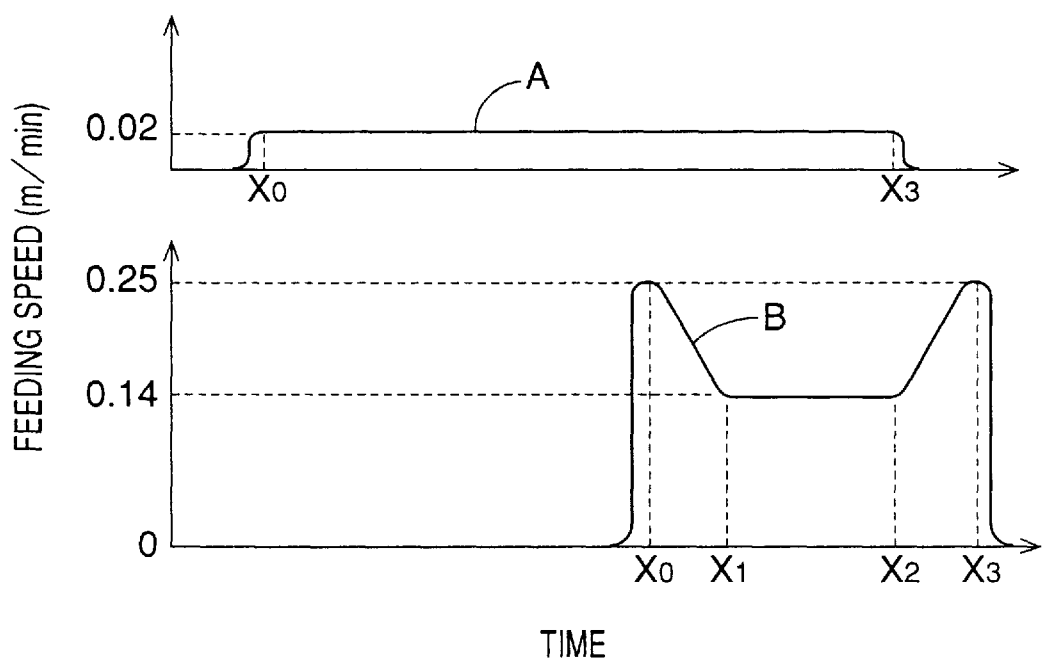
FIG. 20 is a view indicating a patter of change in the speed of movement of the paste delivery device of the apparatus of FIG. 19 when the glass cylinder is coated with the paste.

The film forming apparatus 148 according to the sixth embodiment is adapted to manufacture the heater roller 142 which includes the electrically resistive heat generating layer 34 consisting of the first and second films 146, 144. In this apparatus 148, the two movable members 122a, 122b (and therefore the two paste delivery devices 70 with the respective paste delivery portions 68) are fed such that the feeding speeds are controlled as indicated in the graphs of FIG. 20. In these graphs, the time is taken along the horizontal axis. In the present embodiment, the movable member 122a is first activated to initiate the feeding movement of the corresponding paste delivery device 70 to form the first resinate paste film for the first film 146 of the layer 34, and then the movable member 122b is activated a predetermined time after the activation of the movable member 122a, to initiate the feeding movement of the corresponding paste delivery device 70 to form the second resinate paste film for the second film 144 of the layer 34.

Described more specifically, the feeding speed of the movable member 122a is controlled according to a pattern A as indicated in the upper graph of FIG. 20, that is, held constant a about 0.02 m/min. On the other hand, the feeding speed of the movable member 122b is controlled according to a pattern B as indicated in the lower graph of FIG. 20. That is, the feeding speed is about 0.25 m/min at the positions X0 and X3, and about 0.14 m/min between the positions X1 and X2, and the feeding speed is lowered from about 0.25 m/min to about 0.14 m/min as the movable member 122b is moved from the position X0 to the position X1, and increased from about 0.14 m/min to about 0.25 m/min as the movable member 122b is moved from the position X2 to the position X3. In the present fifth embodiment, the first feeding step (step 2-1 in FIG. 14) is implemented by the movable member 122a, while the second feeding step (step 2-2) is implemented by the movable member 122b. It will be understood that the steps 3-1, 4-1 and 5' in FIG. 14 are not implemented in the present embodiment.

As is apparent from the graphs of FIG. 20, the feeding speed of the movable member 122b according to the pattern B is higher than that of the movable member 122a, and the feeding movement of the movable member 122b is initiated a considerable time after the initiation of the feeding movement of the movable member 122a. The feeding movement of the movable member 122b is terminated a relatively short time after the termination of the feeding movement of the movable member 122a. Thus, a considerably large portion of the second feeding step (feeding movement of the movable member 122b) takes place in the first feeding step (during the feeding movement of the movable member 122a), whereby the time required for forming the first and second resinate paste films is further reduced.

While the presently preferred embodiments of the present invention have been described above by reference to the drawings, it is to be understood that the invention may be otherwise embodied.

In the illustrated embodiments, the electrically resistive heat generating layer 34 is a thin metallic film formed from a resinate paste, the layer 34 may be a thick film formed from a thick-film forming electrically resistive paste which is delivered from the paste delivery device 70 where the layer 34 is formed continuously in the axial direction of the glass cylinder 30. Where the resinate paste is used, a portion of the metal components may be a metal oxide powder or a metal powder which is mixed with the other components.

While the electrodes 32 may be formed by the film forming apparatus 38 in the illustrated embodiments, they may be formed by the conventionally used method such as curved-surface printing and transfer techniques. Since a local thickness variation of the electrodes 32 does not cause a problem, the electrodes 32 need not be formed by the film forming apparatus 38.

The pattern of change of the feeding speed of the paste delivery device 70 is not limited to those of the illustrated embodiments, but may be suitably determined depending upon the axial distribution of the electrical resistance of the heat generating layer 34 and the viscosity of the resinate paste. Where the resinate paste used has a comparatively low viscosity, it is desirable that the feeding speed be comparatively low for forming a continuous film of the resinate paste. In the illustrated embodiments in which the heat generating layer 34 consists of the first and second films 146, 144, the feeding speed of the paste delivery device 70 is determined so that the second film 144 has a helical gap or helical groove. However, the second film 144 may be a film which is completely continuous in the axial direction. In this case, the feeding speed is determined with the electrical resistance of the first film 146 being also taken into account, in order to obtain the desired distribution of the electrical resistance of the heat generating layer 34.

In the illustrated embodiments, the pressure of the compressed air supplied from the air compressor 103 to the storage cylinder 78 is kept constant at about 1.8 kg/cm$^2$. However, the pressure of the compressed air may be changed with a change in the feeding speed of the paste delivery device 70, so as to control the thickness of the resinate paste film. In this case, the thickness of the electrically resistive heat generating layer 34 can be controlled over a wider range.

Although the illustrated embodiments are adapted to feed the paste delivery device 70 relative to the stationary glass cylinder 30 in the axial direction of the glass cylinder 30, the glass cylinder 30 may be axially fed relative to the paste delivery device 70, which is fixed in position in the axial direction of the glass cylinder 30. Namely, the principle of the present invention requires relative movement of the glass cylinder 30 and the paste delivery device 70 in the axial direction of the glass cylinder. While the paste cylinder device 70 is entirely fed relative to the glass cylinder 30 in the illustrated embodiments, only the paste delivery portion 68 of the device 70 may be fed relative to the glass cylinder 30 or vice versa.

While the illustrated embodiments use the position sensors 128 arranged along the axis of the glass cylinder 30 to detect the relative position of the glass cylinder 30 and the paste delivery device 70, the film forming apparatus according to the present invention may use other devices to detect the relative position, for example, a device for indirectly detecting the relative position on the basis of the operating amount of the servomotor 118.

The paste delivery tube for delivering the resinate paste is not limited to the relatively long needle 101 having bending elasticity used in the illustrated embodiments. Although the end portion of the needle 101 is held in pressing contact with the outer circumferential surface of the glass cylinder 30 during application of the resinate paste thereto, the needle 101 may be adapted to take a helical path around the glass cylinder 30 while the needle 101 is held spaced apart from the outer circumferential surface of the glass cylinder 30 by a suitable distance.

While the illustrated film forming apparatus 38, 148 of the illustrated embodiments of the invention are adapted to manufacture the heater roller 10, 142 for fixing a toner on a recording medium, the principle of this invention is equally applicable to any heater roller for other applications, provided the heater roller has an electrically resistive heat generating layer formed on the outer circumferential surface of a cylindrical electrically insulating core or substrate, for heating a desired member in evenly pressing contact with that member.

It is to be understood that the present invention may be embodied with various other changes and modifications, which may occur to those skilled in the art without departing from the spirit and scope of the invention defined in the following claims.

What is claimed is:

1. A method of manufacturing a heater roller which includes a cylindrical electrically insulating substrate having a circumferential surface, and an electrically resistive heat generating layer which is formed on the circumferential surface of said substrate, for heating a desired member in evenly pressing contact with said desired member, said method comprising the steps of:

rotating said cylindrical electrically insulating substrate about an axis thereof;

delivering an electrically resistive paste for forming said electrically resistive layer, from a paste delivery tube of a paste delivery device onto said circumferential surface of said cylindrical electrically insulating substrate; and feeding said paste delivery device and said cylindrical electrically insulating substrate relative to each other in an axial direction of said cylindrical electrically insulating substrate, at a feeding speed which is changed in relation to a relative position of said paste delivery device and said cylindrical electrically insulating substrate in said axial direction, within a range of said feeding speed that permits formation of a film of said electrically resistive paste on said circumferential surface of said substrate, while said electrically resistive paste is delivered onto said circumferential surface of said cylindrical electrically insulating substrate, said film being continuous in said axial direction.

2. A method according to claim 1, further comprising a step of rotating said cylindrical electrically insulating substrate for a predetermined time even after said film of said electrically resistive paste has been formed over a predetermined axial length of said substrate, for reducing a thickness variation of said film of said electrically resistive paste.

3. A method according to claim 1, wherein said step of delivering said electrically resistive paste comprises holding an end portion of said paste delivery tube in pressing contact with said circumferential surface of said cylindrical electrically insulating substrate while said electrically resistive paste is delivered from said end portion of said paste delivery tube and while said paste delivery device and said cylindrical electrically insulating substrate are fed relative to each other.

4. A method according to claim 1, wherein said step of feeding said paste delivery device and said cylindrical electrically insulating substrate comprises changing said feeding speed continuously while said electrically resistive paste is delivered to at least a portion of a predetermined axial length of said substrate over which said film of said electrically resistive paste is formed.

5. A method according to claim 1, wherein said step of feeding said paste delivery device and said cylindrical electrically insulating substrate comprises changing said feeding speed in at least two steps while said film of said electrically resistive paste is formed over a predetermined axial length of said substrate.

6. A method according to claim 1, wherein said step of delivery said electrically resistive paste comprises applying a pressure to said paste delivery device to force said electrically resistive paste from said paste delivery tube onto said circumferential surface of said cylindrical electrically insulating substrate.

7. A method according to claim 6, wherein said step of delivering said electrically resistive paste further comprises controlling said pressure to said paste delivery device in relation to said relative position of said paste delivery device and said cylindrical electrically insulating substrate in said axial direction.

8. A method of manufacturing a heater roller which includes a cylindrical electrically insulating substrate having a circumferential surface, and an electrically resistive heat generating layer which is formed on the circumferential surface of said substrate, for heating a desired number in evenly pressing contact with said desired member, said method comprising:

a rotating step of rotating said cylindrical electrically insulating substrate about an axis thereof;

a delivering step of delivering an electrically resistive paste for forming said electrically resistive layer, from a paste delivery tube of a paste delivery device onto said circumferential surface of said cylindrical electrically insulating substrate, said electrically resistive paste containing a metal-organic compound;

a first feeding step of feeding said paste delivery device and said cylindrical electrically insulating substrate relative to each other in an axial direction of said cylindrical electrically insulating substrate at a constant feeding speed which is determined so as to permit formation of a first film of said electrically resistive paste on said circumferential surface of said substrate, which film is continuous in said axial direction;

a second feeding step of feeding said paste delivery device and said cylindrical electrically insulating substrate relative to each other in said axial direction at a feeding speed which is changed in relation to a relative position of said paste delivery device and said cylindrical electrically insulating substrate in said axial direction, while said electrically resistive paste is delivered onto said circumferential surface of said cylindrical electrically insulating substrate, to form a second film of said electrically resistive paste on said first film; and a heating step of heating said first and second films of said electrically resistive paste to thereby form a thin metal film as said electrically resistive heat generating layer.

9. A method according to claim 8, further comprising a measuring step of measuring a distribution in said axial direction of an electrical resistance of a first film of said electrically resistive heat generating layer, which first film is formed from said first film of said electrically resistive paste in said first feeding step, and wherein said feeding speed of said paste delivery device and said cylindrical electrically insulating substrate in said second feeding step is determined in relation to said relative position, on the basis of the measured distribution of said electrical resistance of said first film of said electrically resistive heat generating layer.

10. A method according to claim 8, wherein a direction in which said paste delivery device and said cylindrical electrically insulating substrate are fed relative to each other in said second feeding step is opposite to a direction in which said paste delivery device and said cylindrical electrically insulating substrate are fed relative to each other in said first feeding step, said second feeding step following said first feeding step without heat treatment for said first film of said electrically resistive paste.

11. A method according to claim 8, wherein said second feeding step is initiated a predetermined first time after said first feeding step is initiated and a predetermined second time before said first feeding step is terminated.

12. A method according to claim 8, further comprising a step of rotating said cylindrical electrically insulating substrate for a predetermined time even after said second film of said electrically resistive paste has been formed over a predetermined axial length of said substrate, for reducing a thickness variation of said film of said electrically resistive paste.

13. A method according to claim 8, wherein said step of delivering said electrically resistive paste comprises holding an end portion of said paste delivery tube in pressing contact with said circumferential surface of said cylindrical electrically insulating substrate while said electrically resistive paste is delivered from said end portion of said paste delivery tube and while said paste delivery device and said cylindrical electrically insulating substrate are fed relative to each other.

14. A method according to claim 8, wherein said step of delivery said electrically resistive paste comprises applying a pressure to said paste delivery device to force said electrically resistive paste from said paste delivery tube onto said circumferential surface of said cylindrical electrically insulating substrate.

15. A method according to claim 14, wherein said step of delivering said electrically resistive paste further comprises controlling said pressure to said paste delivery device in relation to said relative position of said paste delivery device and said cylindrical electrically insulating substrate in said axial direction.

\* \* \* \* \*